US010845271B2

(12) United States Patent
Ghidotti Piovan et al.

(10) Patent No.: US 10,845,271 B2
(45) Date of Patent: Nov. 24, 2020

(54) METHOD AND APPARATUS FOR ANALYZING A SURFACE OF A TYRE

(71) Applicant: PIRELLI TYRE S.p.A., Milan (IT)

(72) Inventors: Alessandro Ghidotti Piovan, Imola (IT); Valeriano Ballardini, Imola (IT); Vincenzo Boffa, Milan (IT); Fabio Regoli, Milan (IT); Luigi Di Stefano, Bologna (IT)

(73) Assignee: PIRELLI TYRE S.p.A., Milan (IT)

( * ) Notice: Subject to any disclaimer, the term of this patent is extended or adjusted under 35 U.S.C. 154(b) by 23 days.

(21) Appl. No.: 15/737,066

(22) PCT Filed: Jun. 21, 2016

(86) PCT No.: PCT/IB2016/053679
§ 371 (c)(1),
(2) Date: Dec. 15, 2017

(87) PCT Pub. No.: WO2017/001969
PCT Pub. Date: Jan. 5, 2017

(65) Prior Publication Data
US 2018/0172557 A1  Jun. 21, 2018

(30) Foreign Application Priority Data

Jun. 30, 2015 (IT) .................. 102015000028836

(51) Int. Cl.
*G01N 21/88* (2006.01)
*G01N 21/956* (2006.01)
(Continued)

(52) U.S. Cl.
CPC ...... *G01M 17/027* (2013.01); *G01N 21/8851* (2013.01); *G06T 7/001* (2013.01);
(Continued)

(58) Field of Classification Search
CPC ............ G01M 17/027; G01N 21/8851; G01N 21/952; G01N 21/95607;
(Continued)

(56) References Cited

U.S. PATENT DOCUMENTS 5,343,919 A  *  9/1994  Yoshida ................... B60C 3/04
                                                        152/209.1
5,786,533 A  *  7/1998  Newman ................ G01B 9/025
                                                        73/146

(Continued)

FOREIGN PATENT DOCUMENTS

EP    1 742 041 A1      1/2007
EP       1742041 A1 *   1/2007  ......... G01N 21/8903
(Continued)

OTHER PUBLICATIONS

International Search Report form the European Patent Office in corresponding International Application No. PCT/IB2016/053679 dated Oct. 25, 2016.
(Continued)

*Primary Examiner* — Yubin Hung
(74) *Attorney, Agent, or Firm* — Finnegan, Henderson, Farabow, Garrett & Dunner, L.L.P.

(57) ABSTRACT

Method and related apparatus for analysing a surface of a tyre, includes: acquiring one or more digital images of a surface portion having a pattern that includes a scheme that is repeated substantially equal thereto in a plurality of positions; identifying a plurality of first regions of said one or more digital images, each corresponding to a respective scheme sub-portion; identifying a respective plurality of regions homologous to each first region, wherein the respective scheme sub-portion is substantially identical to the respective scheme sub-portion of each first region; calculating a model of the respective scheme sub-portion, where each pixel is associated with a mean value of the values (Continued)

associated with the pixels of each first region and of the respective homologous regions having the same relative coordinates of said each pixel; and obtaining a pattern model using the calculated scheme sub-portion models.

31 Claims, 16 Drawing Sheets

(51) Int. Cl.
    *G06T 7/00*     (2017.01)
    *G01M 17/02*     (2006.01)
    *G01N 21/952*     (2006.01)

(52) U.S. Cl.
    CPC ..... *G01N 21/952* (2013.01); *G01N 21/95607* (2013.01); *G01N 2021/8887* (2013.01); *G06T 2207/10152* (2013.01); *G06T 2207/20036* (2013.01); *G06T 2207/20216* (2013.01); *G06T 2207/20224* (2013.01)

(58) Field of Classification Search
    CPC ............ G01N 2021/8887; G06T 7/001; G06T 2207/10152; G06T 2207/20036; G06T 2207/20216; G06T 2207/20224
    See application file for complete search history.

(56) References Cited

U.S. PATENT DOCUMENTS

| | | | |
|---|---|---|---|
| 6,606,422 B1* | 8/2003 | Dulin ................. | H04N 21/4728 348/207.99 |
| 8,615,108 B1* | 12/2013 | Stoppa ................. | G06K 9/4671 382/103 |
| 9,305,338 B1* | 4/2016 | Liu ......................... | G06T 5/003 |
| 2001/0024279 A1* | 9/2001 | Kaneko ............... | G01M 17/027 356/601 |
| 2006/0083347 A1* | 4/2006 | Nosekabel .......... | G01M 17/027 378/61 |
| 2006/0285751 A1* | 12/2006 | Wu ......................... | G06T 7/12 382/199 |
| 2008/0212894 A1* | 9/2008 | Demirli .................... | G06T 11/00 382/276 |
| 2009/0040533 A1* | 2/2009 | Takahashi .......... | G01B 11/2522 356/612 |
| 2009/0281738 A1* | 11/2009 | Fujisawa .............. | G01B 11/306 702/35 |
| 2011/0013823 A1 | 1/2011 | Joly | |
| 2011/0075937 A1 | 3/2011 | Tate | |
| 2013/0329070 A1* | 12/2013 | Zuliani ..................... | G06T 7/32 348/222.1 |

FOREIGN PATENT DOCUMENTS

| | | | |
|---|---|---|---|
| JP | 07159344 A | * | 6/1995 |
| JP | 2011226971 A | * | 11/2011 |
| RU | 2529562 | | 9/2014 |
| WO | WO 2013/045594 A1 | | 4/2013 |
| WO | WO 2017/001970 A1 | | 1/2017 |

OTHER PUBLICATIONS

Written Opinion of the International Searching Authority from the European Patent Office in corresponding International Application No. PCT/IB2015/053679, dated Oct. 25, 2016.

Russian Decision to Grant dated Oct. 3, 2019, from the Russian Federal Service for Intellectual Property, in counterpart Russian Application No. 2018101232.

* cited by examiner

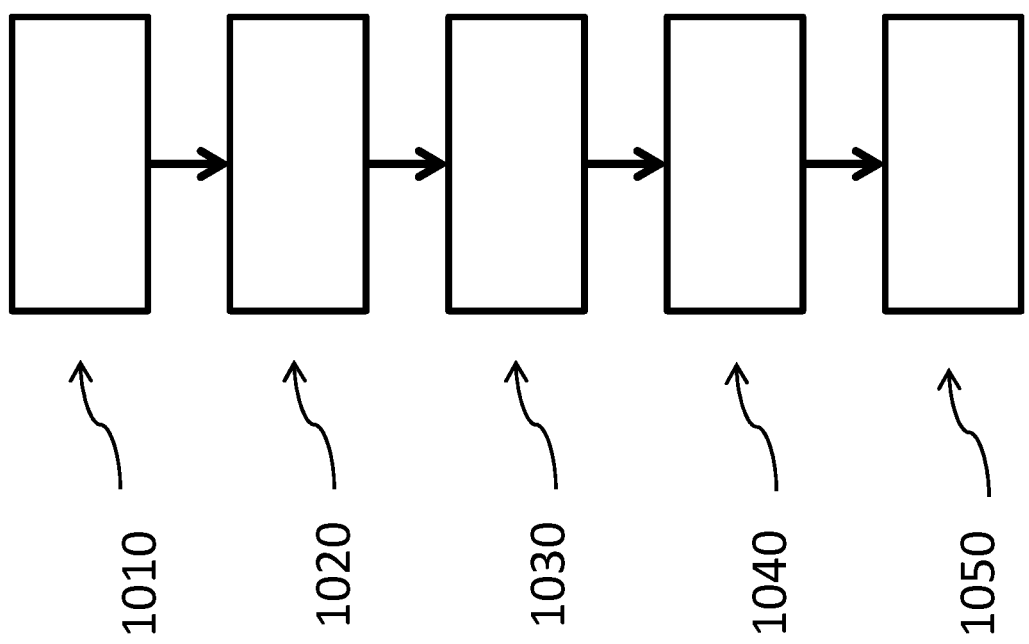

METHOD AND APPARATUS FOR ANALYZING A SURFACE OF A TYRE

CROSS REFERENCE TO RELATED APPLICATIONS

This application is a national phase application based on PCT/IB2016/053679, filed Jun. 21, 2016, and claims the priority of Italian Patent Application No. 102015000028836, filed Jun. 30, 2015, the content of each application being incorporated herein by reference.

BACKGROUND OF THE INVENTION

Field of the Invention

The present invention relates to a method and an apparatus for analysing a surface of a tyre, for example for detecting the possible presence of defects on the tyre surface.

By the term 'defect' it is meant any deviation from a desired condition, irrespective of the fact that such deviation gives rise to a degradation of the performance of the tyre (which can thus be discarded or downgraded) or consists of a simple anomaly (e.g. aesthetic) that does not cause the tyre to be discarded or downgraded. The defects may for example be portions with non-vulcanised compound, alterations in shape, cuts, creeps in the carcass, presence of foreign bodies on the surface, etc.

Description of the Related Art

By "tyre" it is meant the finished tyre, that is, after the moulding and vulcanisation steps. Once the green tyre has been prepared, a moulding and vulcanisation treatment is typically carried out in order to determine the structural stabilisation of the tyre through cross-linking of the elastomeric compositions as well as to impart a desired tread pattern thereon and any distinguishing or information graphic signs at the sidewalls.

According to a typical method, during the moulding and vulcanisation step, a suitable bladder (typically of an elastomeric compound) is inserted inside the tyre and made to expand (e.g. pneumatically) against the inner surface of the same, in order to push the tyre against the outer mould and ensure the proper adhesion thereof to the same. This bladder is typically externally grooved with a pattern of grooves in order to facilitate the local mutual sliding thereof between the inner surface of the tyre and the outer surface of the bladder during vulcanisation and moulding. Such a pattern can facilitate the outflow of air trapped between the bladder and the tyre and/or facilitate the detachment between the bladder and the tyre at the end of the moulding and vulcanisation. Therefore the inner surface of the tyre has a corresponding "pattern", typically in relief. Typically, the pattern comprises a series of rectilinear and parallel spans typically distributed with substantial periodicity along the circumferential direction, and/or a dense network of contiguous geometric shapes (in the jargon called 'pebble edge').

In the present description and claims, by 'pattern' it is more generally meant a set of linear elements arranged on the inner or outer surface of a tyre, such linear elements being generated during the moulding and vulcanisation step of the tyre and being typically in relief, but being able to also be in low relief or simply two-dimensional, i.e. at the same elevation level as the rest of the surface. For example, the tread grooves fall within the definition of pattern. Such surface linear elements are typically rectilinear segments interconnected in a continuous network, but can more generally have any shape and/or surface distribution. Such surface linear elements typically cause a colour change and/or reflectivity/diffusivity of an incident light compared to the rest of the surface.

Typically, a tyre for vehicle wheels has a substantially toroidal structure around an axis of symmetry coinciding with the axis of rotation of the same during operation, and has an axial middle line plane orthogonal to the axis of symmetry, said plane typically being a geometrical (substantial) symmetry plane (ignoring any minor asymmetries, such as tread pattern and/or parts of the inner structure).

By "inner surface" of the tyre it is meant the surface extending inside said toroidal structure from one to the other bead (in other words, the surface no longer visible after the coupling of the tyre with the respective mounting rim).

The inner surface typically belongs to a layer of elastomeric material, usually called "liner", having optimal air impermeability characteristics. Certain defects on the inner surface, such as cuts, open joints, creeps, etc., may impair the air impermeability of the tyre.

In the context of the production processes of tyres for vehicle wheels, the need has been felt to perform quality inspections on finished products, with the aim to prevent defective tyres from being put on the market, and/or to progressively adjust the apparatuses and machinery used so as to improve and optimise the execution of the operations carried out in the production process.

These quality inspections include for example those performed by human operators who dedicate a fixed time to a visual and tactile inspection of the tyre; if, in the light of his own experience and sensitivity, the operator were to suspect that the tyre does not meet certain quality standards, the same tyre is subjected to further inspections, through a more detailed human inspection and/or suitable equipment in order to deepen the evaluation of any structural and/or qualitative deficiencies.

Document WO2013/045594A1 describes a quick method of analysis of the elements in relief on the inner surface of a tyre, comprising the steps of: capturing a three-dimensional image of the surface assigning a grey level value to each pixel of the image proportional to the topographical elevation of that point to obtain a starting image, transforming the captured image in an orthogonal reference system (OXY) in which the abscissa axis (OX) represents the circumferential values, and the ordinate axis (OY) the radial values, assigning a value of the altitude gradient (f(p)) to each pixel on the surface, comparing its elevation with the elevation of a discrete and small number of points arranged on a straight line passing through the respective pixels (p) and oriented in the circumferential direction.

In the field of tyre quality control, the Applicant has set itself the problem of detecting the possible presence of defects on the surface of a tyre by the optical acquisition of digital images and subsequent processing thereof. The Applicant has observed for the quality control to be used "in line" in a plant for the production of tyres, it is necessary that the inspections itself is performed in a reduced time and with reduced costs. In this context, the computational requirement of the processing algorithms plays a crucial role, since when it is excessive, the control times increase unacceptably and/or the computational capacity required makes the control unfeasible.

By "digital image", or equivalently "image", it is generally meant a set of data, typically contained in a computer file, in which each tuple of coordinates (typically each pair of coordinates) of a finite set (typically two-dimensional and matrix, i.e. N rows×M columns) of tuples of spatial coordinates (each tuple corresponding to a pixel) is associated with a corresponding set of numerical values (which may be representative of different magnitudes). For example, in monochrome images (such as those in grey levels or 'greyscale'), such a set of values consists of a single value in a finite scale (typically 256 levels or tones), this value for example being representative of the luminosity (or intensity) level of the respective tuple of spatial coordinates when displayed. A further example is represented by colour images, in which the set of values represents the luminosity level of a plurality of colours or channels, typically the primary colours (for example red, green and blue in RGB coding and cyan, magenta, yellow and black in CMYK coding). The term 'image' does not necessarily imply the actual display of the same.

In the present description and claims, the term 'image' encompasses both the three-dimensional images, in which each pixel is associated with a surface altitude information (such as the images obtained with laser triangulation), and two-dimensional images, in which each pixel is associated with information representative of the colour and/or reflectivity/diffusivity of the respective point of the surface, such as the images detected by the common digital cameras or video cameras (e.g. CCD).

By 'point of the surface' it is meant a surface portion having a small (not zero) extension compatible with the size of a pixel of an acquired image of the surface.

In the present description and claims, any reference to a specific "digital image" (for example, the digital image initially acquired on the tyre) includes more generally any digital image obtainable through one or more digital processing of said specific digital image (such as, for example, filtering, equalization, smoothing, binarisation, thresholding, morphological transformations (opening, etc.), derivative or integral calculations, etc.).

SUMMARY OF THE INVENTION

The Applicant has noted that the presence of the pattern on the tyre surface disturbs the image and/or its processing, since it tends to hide or mask the defects.

Furthermore, according to the Applicant, the anomalies on the pattern, which per se may be such as to not justify a discard of the tyre, may however be indicative of further defects in the production process steps (such as a lack of adherence between the bladder and tyre, resulting in incomplete vulcanisation). Therefore, the Applicant considers detecting any anomalies of the pattern itself advantageous.

More in general, the Applicant considers it advantageous to have a reference model of a pattern arranged on a surface of a tyre and free of defects, for example to be able to compare the actual pattern with the model in order to detect any real deviations from that model, or to be able to distinguish any defects from the pattern itself.

The Applicant has also perceived the practical difficulty, if not impossibility, of having a predetermined model valid for a number of tyres to be analysed serving as a reference for the defect-free pattern, since bladders typically vary according to the manufacturer and even according to the model, and in addition, they are subjected to ageing and/or are replaced frequently. Moreover, also possible macro variations in the lighting in the image acquisition step and/or in the reflective response of the tyre surface may make the use of a predetermined model of the defect-free pattern unfeasible.

The Applicant, in the context of quality control of tyres (in particular for the detection of defects on the inner surface of tyres) based on the acquisition and processing of digital images in an industrial tyre production line, with reduced computational costs and requirements, reliable in the result obtained and also with a high degree of sensitivity in the detection of defects, in particular being capable of detecting surface defects even in the presence of a surface pattern, including defects of the pattern itself, has therefore considered the problem of developing a method of analysing the surface of tyres capable of extracting, for each tyre under analysis, a respective defect-free pattern model, at least when the pattern consists of a predetermined scheme that is repeated, substantially equal thereto, a plurality of times.

In a first aspect thereof, the invention relates to a method for analysing a surface of a tyre, comprising:

a) providing the tyre having said surface to be analysed, wherein said surface has a pattern having a scheme that is repeated, substantially equal thereto, in a plurality of positions;

b) acquiring one or more digital images of a portion of the surface, said portion of the surface being selected in a manner such that said pattern in said surface portion comprises said scheme repeated a plurality of times;

c) identifying a plurality of first regions of said one or more digital images, each first region corresponding to a respective sub-portion of the scheme, wherein each first region comprises a plurality of pixels characterised by respective relative coordinates in said first region;

d) identifying a respective plurality of regions of said one or more digital images homologous to each first region, wherein each homologous region comprises a plurality of pixels characterised by respective relative coordinates in said homologous region and wherein a respective scheme sub-portion in each homologous region is substantially identical to said respective scheme sub-portion of said each first region;

e) for each first region, calculating a model of the respective scheme sub-portion, said scheme sub-portion model being a digital image wherein each pixel is associated with an average value of values associated with the pixels of said each first region and of the respective homologous regions having the same relative coordinates of said each pixel, thus obtaining a plurality of calculated scheme sub-portion models;

f) obtaining a model of said pattern in said surface portion by combining said calculated scheme sub-portion models.

By 'average value' it is meant any descriptive value of a central tendency of the respective statistical distribution. The average value for example comprises any analytical mean (which satisfies a condition of invariance) and any position mean, or combinations thereof. Examples of analytical mean are arithmetic mean, geometric mean, harmonic mean, quadratic mean, cubic mean, etc., while example of position mean are mode and median. According to the Applicant the above method, in particular by the identification of the respective homologous regions and to the calculation of an average value of the values associated with the pixels of each first region and of the respective homologous regions having the same relative coordinates, is able to create a pattern model where the value associated with each pixel is calculated with a reduced or null contribution of any defects. In fact, typically if a defect occurs it is present in only one or at most few homologous regions, all other homologous regions having the substantially 'correct' scheme, i.e. free of defects (and at most having a variance given by slight distortions). The defect typically generates an alteration—even significant—of the corresponding value in all pixels affected by the defect only in the homologous region affected by the defect, compared with the value of the corresponding pixels of the other defect-free regions. By calculating an average value, the defect contribution is diluted, the value of the other pixel samples prevailing. Therefore, compared with a moderate computational request, the above method allows auto-learning from each tyre (i.e. deriving from the acquired image and/or further processing thereof, without the need of reference images or models of the pattern) an ideal pattern model (or portions thereof), i.e. free of defects, for example for a subsequent comparison between the acquired image (and/or subsequent processing thereof) and the model (and/or subsequent processing thereof).

Preferably, said plurality of first regions forms a connected portion of said one or more digital images comprising at least said scheme. Preferably, said connected region extends less than two times said scheme. In this way, a model of the entire pattern is calculated with a limited computational request.

Preferably, said first regions are partially overlapped on each other in an axial direction and/or in a circumferential direction of the tyre. In this way, a certain degree of information redundancy is introduced in the reconstruction of the model at the edges of the regions.

Preferably, each plurality of homologous regions includes all the regions of said one or more images having a respective scheme sub-portion substantially identical to said scheme sub-portion of the respective first region. In this way, the calculation of the model counts all the contributions available in the starting image.

Preferably, identifying said respective plurality of homologous regions comprises calculating a correlation function between said respective first region and (at least one portion of) a remaining part of said one or more digital images. In this way, the computational request is limited.

Preferably, identifying said respective plurality of homologous regions comprises identifying one (at least local) extremum of said correlation function. In this way, the regions most similar to each other are effectively identified.

Preferably, said surface portion is selected such that in said one or more digital image, said scheme is repeated substantially equal thereto at least eight times, more preferably at least ten times. In this way, the calculated scheme model is sufficiently robust and reliable.

Typically, the scheme is repeated substantially equal thereto in a plurality of positions distributed along a circumferential direction of the tyre, and said respective plurality of homologous regions are distributed along the circumferential direction.

Typically, the scheme is repeated substantially equal thereto along a direction of periodicity (typically the circumferential direction) with a substantially constant period, more preferably with continuity. As described above, the inner surface (or tread) typically has a pattern of relief (or low-relief) elements according to a scheme that is repeated with substantial periodicity and continuity (i.e. without intervals devoid of pattern) along said direction of periodicity (usually circumferential).

Preferably, before identifying the respective plurality of homologous regions, it is contemplated to acquire a value representative of said period, more preferably it is contemplated to derive a value representative of said period by processing said one or more digital image, even more preferably by seeking a maximum of a correlation function between a portion of said one or more digital images and a plurality of further portions of said one or more digital images having dimensions equal to the dimensions of said portion of said one or more digital images, and distributed along a direction of periodicity (usually circumferential). In this way, the method self-learns the value of the period which can be used in the identification of homologous regions with considerable savings in computational resources. Advantageously, said portion of said one or more digital images develops by a length, along said direction of periodicity, greater than or equal to an overall length of the scheme and less than or equal to three times said overall length of the scheme.

Preferably, identifying said respective plurality of homologous regions comprises identifying a respective first homologous region by calculating said correlation function between said each first region and a plurality of regions having size equal to said each first region and arranged around a point of said one or more digital images located along said periodicity direction at a distance from said each first region equal to an integer multiple of said period, more preferably equal to said period. Advantageously, this drastically reduces the computational demand, restricting the search for the homologous regions in a narrow region, and at the same time seeking in a suitable neighbourhood, any deviations from the exact circumferential periodicity condition and/or displacements in the axial direction of consecutive homologous regions and/or small rotations thereof (phenomena which are for example due to deformation of the mould expansion chamber) are obviated.

In one embodiment, identifying said respective plurality of homologous regions comprises identifying a respective homologous region using said each first region (for example for the n-th respective homologous region by calculating said correlation function between said each first region and a plurality of regions having size equal to said each first region and arranged around a point of said one or more digital images located along said periodicity direction at a distance from said each first region equal to n times said period).

In an alternative embodiment, identifying said respective plurality of homologous regions comprises identifying a sequence of respective homologous regions in succession, each respective homologous region of said sequence being identified by using the respective preceding homologous region in the sequence (more preferably the immediately preceding respective homologous region). This advantageously takes into account the propagation of the deformations (e.g. the non-periodicity and/or said displacements along said direction of periodicity).

In an alternative embodiment, in calculating said model of the respective scheme sub-portion, said average value comprises, or consists of, the arithmetic and/or geometric and/or quadratic mean, and/or the mode, and/or combinations thereof, of said values. These average values have proven sufficiently robust to typical defect contributions.

In a preferred embodiment, said average value comprises, or consists of, the median value of said values. In this way, the value associated with each pixel of the model of the scheme sub-portion is calculated without any contribution by any defects, since the latter has a corresponding value that is typically outside (and distant) from the median value of the values of the corresponding pixels of the other defect-free regions.

Preferably, acquiring one or more digital images includes acquiring a first image in which each pixel is associated with a luminosity value representative of the reflectivity and/or diffusivity and/or colour of a point on the surface corresponding to said each pixel. Preferably, the point on the surface is illuminated with diffused light.

It is noted that the meaning of the term 'luminosity value' denotes the 2D nature of the image, i.e. the nature of a normal photography the acquisition of which is simple and fast. However, the present invention is also applied to 3D images.

In one embodiment, said operation of obtaining a value representative of the period and/or said operation of identifying a plurality of first regions and a respective plurality of homologous regions is/are carried out in said first image and by processing said first image (e.g. said correlation functions are calculated on the luminosity values associated with the pixels, or processing thereof).

Preferably, acquiring one or more digital images includes acquiring a second and a third image in which each pixel is associated with a luminosity value representative of the reflectivity and/or diffusivity and/or colour of a point of the surface corresponding to said each pixel, said point of the surface being illuminated with grazing light (for example forming an acute angle greater than 40°, more preferably greater than 55°, with the normal to the surface at said point), more preferably coming from opposite directions, respectively.

Preferably, acquiring one or more digital images includes calculating a difference image in which each pixel is associated with a value representative of the difference of the corresponding luminosity values of said second and third image.

In a preferred embodiment, the operation of obtaining a value representative of said period and/or the operation of identifying a plurality of first regions and a respective plurality of homologous regions (in particular said operation of calculating a correlation function in order to derive the period or identify the homologous regions) is/are carried out at least in said difference image, by processing said difference image. The Applicant has in fact discovered, after repeated tests, that the self-learning of the period and/or the identification of the homologous regions by processing the difference image of images acquired in grazing light (in particular through the calculation of said correlation function in the difference image) may be more robust with respect to a corresponding processing of the image acquired in diffuse light. According to the Applicant, this is due to the fact that, by making the difference between the two images in grazing light, on the one hand the elements of the pattern/scheme that are in relief are emphasized, on the other hand any two-dimensional elements (such as spots, etc.) that are not part of the pattern/scheme are reduced (even up to their disappearance).

Preferably, identifying each of said first regions and said respective plurality of homologous regions comprises identifying, by means of processing said difference image, a respective position of said each first region and of said respective homologous regions in said difference image and subsequently identifying, in said first image, a corresponding first region and a corresponding respective plurality of homologous regions having said respective positions.

Preferably, said operation of calculating said model of said respective scheme sub-portion is carried out on said first image. The Applicant has in fact verified that the construction of the model on the image in diffuse light makes the same model easily comparable with the image in diffuse light, for example for the detection of defects.

In one embodiment, for each pixel of at least one image among said one or more digital images it is contemplated to calculate a gradient of said values associated with the pixels along two coordinates (typically mutually orthogonal) of said image. The term 'gradient' in the present application is used in a general sense to indicate the variation of the values associated with the pixels along two coordinates, and not necessarily with reference to the differential calculation. Preferably, said gradient is a vector with two components representative of a variation of said values along said two coordinates, respectively. Typically, each pixel is associated with a gradient modulus value (e.g. representative of the quadratic sum of said two components), and a gradient orientation value (e.g. representative of the angle formed by said vector with respect to a reference direction). Preferably, the orientation is normalized in the range [0-180°] or [−90°-+90°].

In a preferred embodiment, one or more from among said operations of identifying said plurality of first regions, identifying said respective plurality of homologous regions, calculating said model of respective scheme sub-portion and calculating said pattern model are carried out by being based on said gradient modulus values (e.g. said values associated with the pixels are the gradient modulus values and said correlation functions and/or said average value are calculated on said gradient modulus values).

In one embodiment, one or more from among said operations of identifying said plurality of first regions, identifying said respective plurality of homologous regions, calculating said model of respective scheme sub-portion and calculating said pattern model are carried out on said gradient orientation values (e.g. said values associated with the pixels are the orientation modulus values and said correlation functions and/or said average value are calculated on said orientation modulus values). The Applicant has in fact verified that the above method provides reliable results when using the gradient modulus and/or orientation values. In this case, advantageously, a pattern model is obtained as a result in which each pixel is associated with the gradient modulus and/or orientation values.

In an alternative embodiment, for each pixel of the pattern model (in luminosity values) calculated on said first image, provision is made for calculating a gradient modulus value and a gradient orientation value of luminosity values. Also in this way, a pattern model is obtained in which each pixel is associated with the gradient modulus and/or orientation values, similar to the method in the previous paragraph.

In the present description and claims, any reference to a digital image (e.g. the first image, the difference image, the model of respective scheme sub-portion or the pattern model) is understood to include, if not specified, such image in luminosity values and/or in gradient modulus values and/or in gradient orientation values calculated on the luminosity values.

Preferably, said pattern model is obtained by substituting, in at least one image from among said one or more images (more preferably in said first image), each first region and the respective homologous regions with said model of respective scheme sub-portion. In this way (also taking into account the deformations found on the actual pattern), a complete pattern model without defects is obtained, which can be superimposed to the entire real pattern in said one or more images.

Advantageously (e.g. when the pattern occupies the entire surface portion), such pattern model can be a global model image of the surface portion comparable with said at least one of said one or more digital images, and containing a complete model of the surface portion without defects which can be superimposed to said one or more images.

Preferably, it is contemplated to compare said one or more digital images (more preferably the first digital image), with said pattern model and, based on such comparison, detecting possible defects in said one or more digital images.

Preferably, it is contemplated to calculate a dilated pattern model by means of a dilation operation conducted on the pattern model, more preferably based on said modulus gradient values of the pattern model in luminosity values. In this way, variations/defects/drifts in the real pattern scheme are taken into account with a certain degree of tolerance in the comparison with the starting image.

Preferably, said dilation comprises assigning, to each pixel of the dilated pattern model, the maximum value of the gradient modulus value calculated in a predetermined area around the corresponding pixel in said pattern model (said area preferably having a radius of between 3 and 10 pixels).

Preferably, the pattern model is processed, before or after said dilation, on the basis of said gradient modulus value, so as to obtain a binary model (preferably dilated) of pattern wherein each pixel is associated with a first index (preferably binary) whose value is representative of whether the pixel belongs to the pattern (preferably dilated) or not. The Applicant has in fact verified that the binarisation on the gradient modulus (before or after the dilation) is more robust and/or less noisy than, for example, a binarisation on the luminosity values. Also in this way, advantageously, a binary model (dilated) of the pattern is obtained which is easily comparable with the starting image, for example to decide whether a certain pixel of the latter belongs or not to the pattern, possibly in case of dilated model, also taking into account the tolerances inherent in possible deformations of the pattern.

Preferably, each pixel of said dilated binary model of pattern belonging to a dilated pattern is associated with a second index, the value of which is representative of an at least local orientation of a dilated pattern section passing by said pixel. In this way, a pattern model is provided which also allows a comparison between the orientations of the model pattern sections and the orientations of the sections (of the pattern or potential defects) present on the acquired image.

Preferably, for each pixel, the value of said second index is selected on the basis of (for example equal to) the gradient orientation value of the pixel with maximum value of the gradient modulus value in a predetermined neighbourhood of said each pixel in said pattern model. In this way, advantageously, also a dilation of the gradient orientation in the model is conducted, which favours the high-modulus pixels in the gradient, which is typically a condition of the pixels belonging to the pattern sections, and excludes the low-modulus pixels of the gradient, which are less significant. In this way it is advantageously prevented that in the crossings between pattern sections with a different orientation, there is an orientation of a section that "invades" the crossing section or that crossing pixels are privileged in which the orientation is not significant.

Preferably, said surface portion is a circumferential inner surface portion, more preferably corresponding to an angle in the centre that is greater than or equal to 30°, more preferably greater than or equal to 60°, typically equal to at least one round angle.

Preferably, said circumferential inner surface portion has a width in a plane passing by said axis, greater than or equal to 50 mm, more preferably greater than or equal to 80 mm, and/or smaller than or equal to 200 mm, more preferably smaller than or equal to 150 mm.

Preferably, the method is repeated by varying each time said circumferential inner surface portion so that all the surface portions make up at least one whole inner surface half-portion that extends from the median plane to a bead.

Preferably, the method comprises carrying out the analysis described above while keeping the tyre resting on one of the sidewalls. Preferably, the method comprises tilting the tyre so as to rest it on an opposite sidewall and repeating the operations described above.

According to a second aspect thereof, the invention relates to an apparatus for analysing tyres in a tyre production line.

The apparatus comprises:
a support for a tyre, preferably horizontal and preferably adapted to rotate around an axis perpendicular thereto;
at least one source adapted to emit at least one light radiation for illuminating a surface portion of the tyre, when set on the support, and, at a distance from said source, a detection system adapted to detect an optical intensity of the light radiation reflected and/or diffused by said surface portion; and
a processing unit configured for actuating the method according to the first aspect of the present invention.

Preferably, the detection system comprises a linear camera having an objective line lying on an optical plane passing by the linear camera.

Preferably, said at least one source includes a first light source, a second light source and a third light source adapted to emit a first, a second and a third light radiation, respectively, for illuminating said surface portion, more preferably a linear surface portion coincident with or near the objective line.

Preferably, said first light source and second light source lie on opposite sides, respectively, with respect to said optical plane.

Preferably, each of said first and second light source is adapted to illuminate said objective line with a respective grazing light, and said third light source is adapted to illuminate said objective line with diffuse light.

In one embodiment, the detection system comprises a mirror having a reflective surface arranged at the third light source perpendicular to the optical plane and intersecting the latter (typically on the median line of the mirror) in a manner so as to reflect said objective line in the optical plane by an angle greater than or equal to 30° or smaller than or equal to 135°. In this way, advantageously, during the inspection of the inner surface of the tyre, the linear camera remains positioned in the central area of the tyre while the group with the light sources works close to the inner surface.

Preferably, the apparatus comprises a command and control unit configured for:
activating, in alternating sequence, said first light source, second light source and third light source; and
driving said linear camera for respectively acquiring said first, second and third image synchronously with the activation of said first light source, second light source and third light source, respectively. In this way, it is possible to acquire both an image in diffuse light and two images in grazing light.

Preferably, the apparatus includes a movement member adapted to rotate said support, about an axis of rotation thereof, the command and control unit being configured for controlling said movement member.

Further features and advantages will become more apparent from the detailed description of some exemplary but non-limiting embodiments of a method and an apparatus for analysing the surface of a tyre in a tyre production line, according to the present invention.

BRIEF DESCRIPTION OF THE DRAWINGS

Such description will be given hereinafter with reference to the accompanying figures, provided only for illustrative and, therefore, non-limiting purposes, in which:

FIG. 15 shows a flow chart of the method of the present invention.

DETAILED DESCRIPTION OF THE INVENTION

Figure 1:
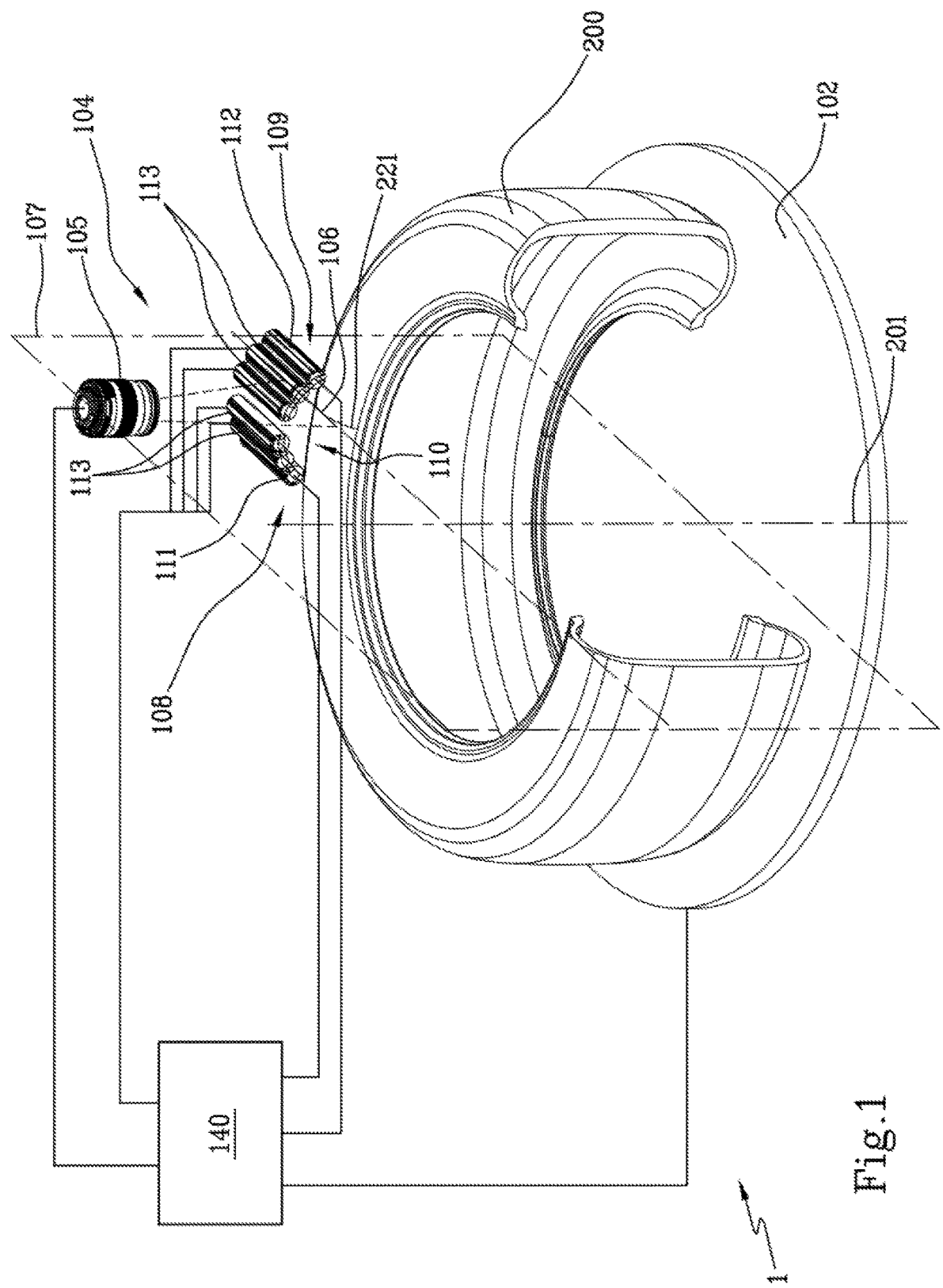
FIG. 1 shows a schematic diagram, in terms of functional blocks, of an apparatus for analysing the surface of tyres according to the present invention.

With reference to the figures, reference numeral 1 generally indicates an apparatus for analysing a surface of tyres in a tyre production line according to the present invention.

Apparatus 1 comprises a support 102 adapted to support tyre 200 on a sidewall and to rotate the same about an axis of rotation 201 coinciding with the axis of rotation of the tyre and typically arranged according to the vertical. Support 102 is typically operated by a driving member, not further described and shown, since it may exemplarily be of known type.

Apparatus 1 comprises a source 104 adapted to emit at least one light radiation for illuminating a surface portion of the tyre set on the support, and, at a distance from said source, a detection system 105 adapted to detect an optical intensity of the light radiation reflected and/or diffused by the surface portion.

The detection system 105 comprises a camera, preferably linear and having an objective line 106 lying on an optical plane 107 passing by the linear camera and the axis of rotation 201.

Source 104 comprises a first light source 108, a second light source 109 and a third light source 110 adapted to emit a first, a second and a third light radiation, respectively, for illuminating a linear surface portion 211 of said tyre coinciding with the objective line (for example, when the surface portion is planar) or in the vicinity of the objective line (due to the curvilinear trend of the tyre surface).

The detection system 105 is adapted to acquire a respective two-dimensional digital image of the linear surface portion of the surface illuminated by at least one of the first, second and third light radiation.

Typically, the apparatus comprises a robotic arm (not shown) on which the first, second and third light source and the detection system are mounted.

Preferably, the first light source 108 and the second light source 109 consist each of a single respective sub-source 111 and 112. Preferably, the third light source 110 consists of four respective sub-sources 113 distributed on both sides of the optical plane 107 and symmetrically with respect to such plane.

Each sub-source 111-113 has a respective main direction of development which develops parallel to the optical plane 107 and thus to the objective line 106.

Each sub-source typically comprises a plurality of LED light sources arranged aligned along the main direction of development.

Figure 2:
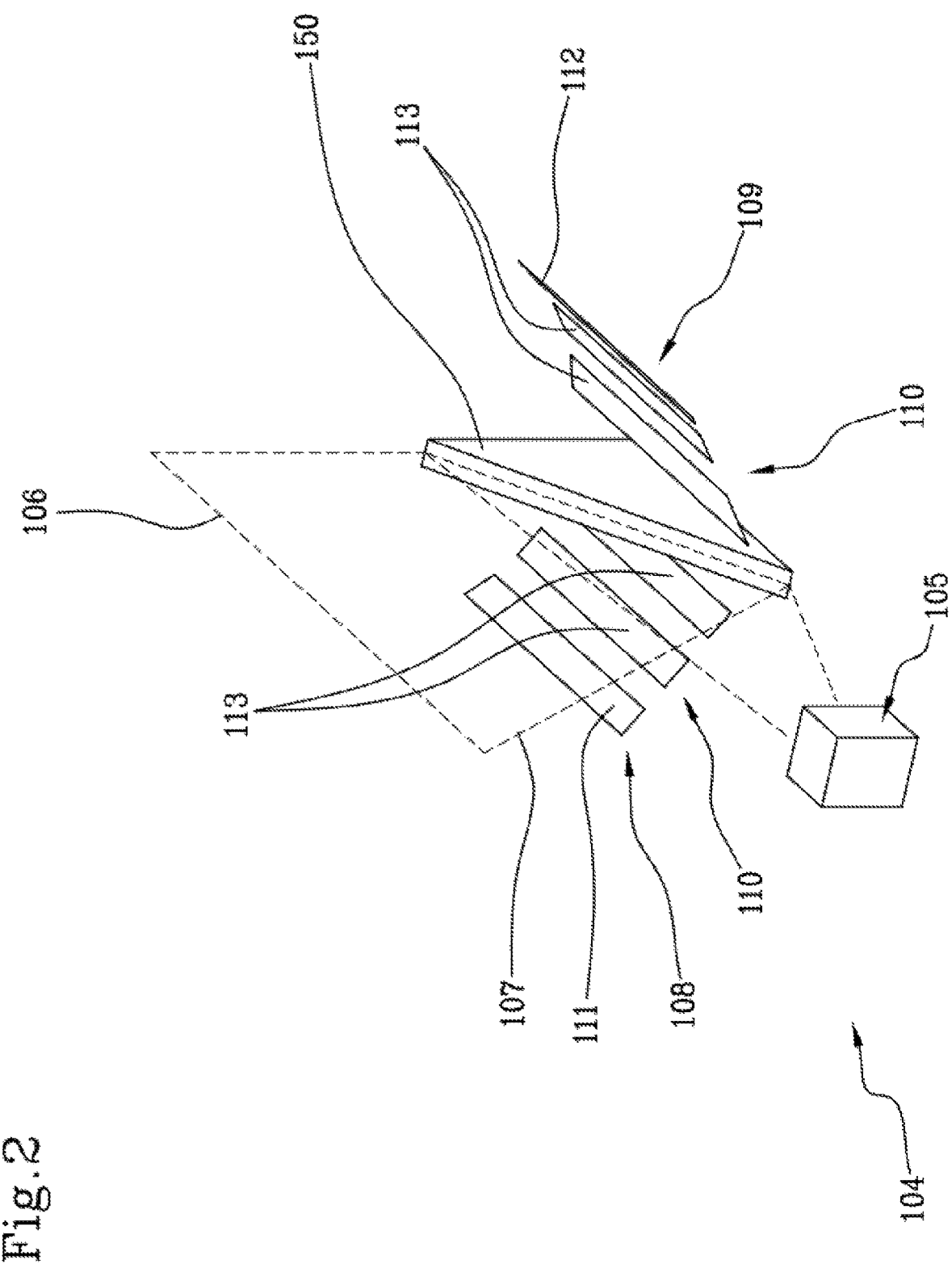
FIG. 2 shows a schematic view of a part of the apparatus according to the present invention according to an embodiment variant.

In FIG. 2, the light sub-sources are schematically shown with reference to their respective emitting surface (exemplarily of rectangular shape), which may for example coincide with a transparent protective and/or diffuser glass. Exemplarily, the sub-sources have a dimension along the main direction of development equal to 6 cm and a dimension along the direction orthogonal to the main direction of development equal to about 1 cm.

Preferably, the sub-sources 111 and 112 lie on opposite sides, respectively, with respect to the optical plane and are equidistant therefrom.

Preferably, the distance of the sub-sources 113 of the third light source from the optical plane 107 is smaller than the distance between each sub-source of said first light source and second light source and the optical plane.

Preferably, the third light source 110 is adapted to illuminate the objective line with diffused light (for example a respective angle having its vertex in each point of the objective line and lying in a plane orthogonal to the objective line, and subtended by the third light source, is equal to about 80°).

In an embodiment of the apparatus particularly adapted for the inspection of the inner surface of the tyre, exemplarily shown in FIG. 2, the detection system includes a mirror 150 (typically also mounted on the robotic arm) having a flat reflective surface arranged at the third light source perpendicularly to the optical plane and intersecting the latter on the median line of the mirror, so as to reflect the objective line in the optical plane by an angle exemplarily equal to 90°.

Preferably, a command and control unit 140 is comprised, configured to activate in an alternating sequence the first, second and third light source, and control the linear camera for acquiring a first, second and third image, respectively, in synchronization with the activation of the first, second and third light source, respectively.

The command and control unit is typically configured to also control the handling member of support 102.

The apparatus comprises a processing unit (for example integrated in the command and control unit 140 or in communication therewith or with the detection system 105 for receiving said acquired images) configured for implementing the method according to the present invention.

In operation, a tyre 200 is placed on support 102 and subjected to a (preferably full) rotation around its axis of symmetry 201 in order to detect a two-dimensional digital image of an inner surface portion, preferably along the whole circumferential development.

During the rotation, the command and control unit cyclically activates, in rapid alternating sequence, said first, second and third light source and activates the linear camera to acquire a respective two-dimensional linear digital image (colour or monochrome) of the respective linear surface portion in synchrony with the activation of the first, second and third light source, respectively. By way of example, every single linear digital image comprises 1×2048 pixels in the case of monochrome camera, or 2×2048 pixels in the case of RGB colour or bilinear camera.

By way of example, the time-lag between the acquisition of the first and second linear image, as well as between the second and third linear image and then cyclically between the first and third linear image, is less than 0.2 milliseconds.

Once the desired rotation of the tyre to scan the desired surface portion has been carried out, preferably at least one full rotation in order to acquire all the circular development, a unique digital image is obtained, made with all the linear digital images of the sequence of linear portions, each illuminated with the three light sources.

The processing unit receives such image from the detection system and separates therefrom the corresponding first, second and third image of the entire desired surface portion.

Such images can be substantially superimposed, pixel by pixel, although the real linear surface portion associated with a single linear image does not exactly corresponds to the three images, due to the rotation of the tyre occurred meanwhile. However, the selection of the acquisition frequency of the linear images and of the speed of rotation is such that the three linear images are mutually interlaced and thus comparable pixel by pixel.

Figure 3:
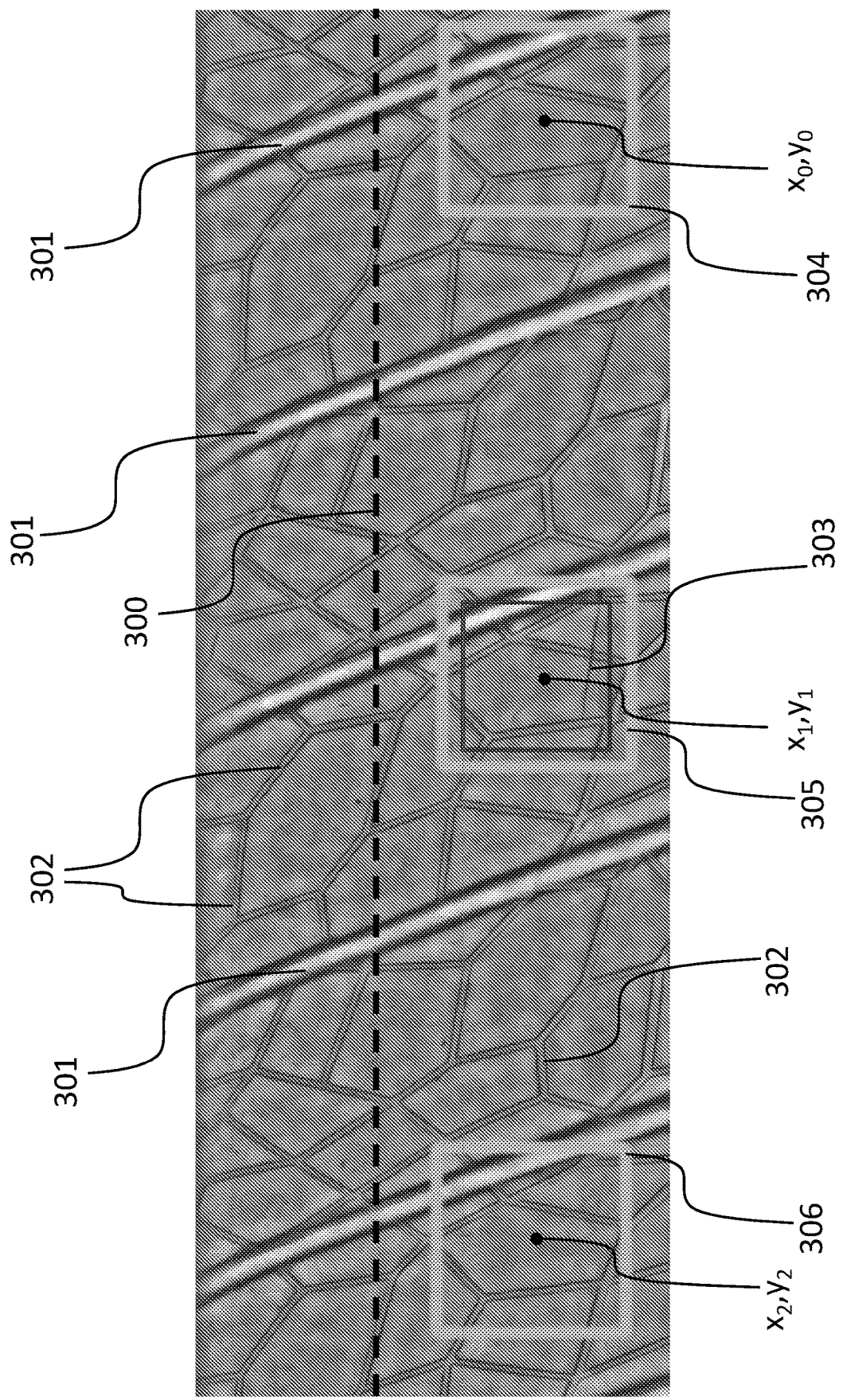
FIGS. 3-14 show some steps of the method using a visual representation of respective digital images.

FIG. 3 shows an exemplary visual representation in grey scale of an example of said first image, that is, of a two-dimensional digital image, acquired in the visible frequency range, of an inner surface portion of a tyre illuminated with diffused light (totally similar to a common black and white picture). The circumferential direction of the tyre is arranged along the horizontal direction in the figure (straight line 300).

In the example in FIG. 3, each pixel of the digital image is associated with a scalar value (grey level or scale) in a scale of 255 levels directly representative of the reflectivity and/or diffusivity and/or colour of the inner surface point corresponding to the pixel considered. The present invention may also be applied to digital images in which each pixel is associated with a vector value, such as digital colour images. For example, the method described herein may be carried out on each channel/colour or combinations thereof, or on a selected channel (e.g. green, which advantageously provides a better image quality).

The digital image on which the method described herein is carried out may coincide with the digital image directly detected by the detection system or, more preferably, may be subjected, before carrying out the method described herein, to a pre-processing to improve the quality thereof. Said pre-processing may comprise one or more of filtering, balancing, noise reductions, smoothing, for example as known in the art. Hereinafter it is assumed that such pre-processing does not change the two-dimensional digital nature of the image, such that each pixel is associated with a luminosity (or tone) value representative of the reflectivity and/or diffusivity and/or colour of the inner surface.

As seen in FIG. 3, the inner surface of the tyre is grooved by a plurality of reliefs that form a "pattern." The presence of the reliefs produces a variation in the reflectivity of the inner surface detected by the camera. The present invention is also applicable to low relief or simply two-dimensional patterns, i.e. consisting only in a variation of colour and/or reflectivity and devoid of depth. Typically, the pattern comprises a series of rectilinear sections 301 substantially mutually parallel, typically distributed with substantial periodicity along the circumferential direction, and a dense network (in the jargon called 'pebble edge') of substantially rectilinear segments 302 interconnected in a substantially continuous network, the pattern being typically characterised by a substantial periodicity thereof along the circumferential direction. It is noted that the pattern develops on the inner surface of the tyre, which is provided with its own curvature.

Preferably, the pattern consists of closed broken lines (polygons) connected to each other. Typically, the pattern consists of polygons adjacent to each other (e.g. is devoid of isolated polygons).

The pattern has a scheme that is repeated substantially equal thereto in a plurality of positions distributed along the circumferential direction, typically with a substantial circumferential periodicity (for example with a local period variation, in absolute value, falling within 5% of the average period calculated on the whole image), even more typically with continuity along the whole digital image. In the example shown, the pebble edge has a circumferential periodicity equal to twice the periodicity of the rifling, whereby the overall periodicity of the pattern is equal to that of the pebble edge.

As stated said above, reliefs 301, 302 are the imprint left by the pneumatic bladder. In practice, said scheme is typically repeated along the circumferential direction with slight variations in the periodicity and/or shape and/or orientation and/or axial position, while remaining substantially equal, such variations being due for example to the non-uniformity of the bladder expansion and/or positioning, and/or to small distortions of the pattern imprinted on the bladder itself, and/or to phenomena of distortion in the image detection process (for example, due to faulty centering of the axis of rotation of the tyre, non-perfect circularity of the tyre, etc.).

For more clarity, FIG. 3 shows a circumferential digital image portion long, along direction 300, only two and a half times around the period of the pattern; however, typically the processed digital image corresponds to a circumferential inner surface portion comprising said scheme repeated at least eight-ten times. Preferably, the circumferential inner surface portion processed covers the entire circumferential inner development of the tyre.

Typically, the processed digital image corresponds to a portion of the inner surface having a length in the axial direction (the direction perpendicular to direction 300 in FIG. 3) of at least 5 cm, preferably equal to at least half of the overall axial development of the tyre crown.

FIG. 3 is shown an exemplary defect 303 (shown enlarged in FIG. 3a which shows a rotated detail of FIG. 3) consisting in a cut that crosses at least one segment of the pattern.

Preferably, the method provides for deriving a value representative of the pattern period through digital image processing, for example by seeking a maximum of an autocorrelation function (for example, the Pearson correlation coefficient calculated on the values associated with the pixels of the image) between a given portion (in the jargon called 'support') of the digital image (having adequate dimensions, for example circumferential length greater than the period and smaller than three times the period) and a plurality of further portions of the digital image having dimensions equal the to the dimensions of said given image portion and arranged in circumferentially distributed positions. Preferably, the circumferential autocorrelation is repeatedly calculated with reference to multiple different supports and partially overlapping in the axial direction of the image, and having the same dimensions, with the aim of selecting the most reliable autocorrelation peak to identify the pattern period. Alternatively, it is provided to acquire a predetermined value of the period, for example from a measurement and/or from the specifications of the bladder.

The method involves identifying a first region 304 of the digital image corresponding to a sub-portion of the scheme, for example having a smaller circumferential development than an entire circumferential development of the scheme (in the example equal to about one third of the circumferential development of the scheme, coinciding with said period). The dimensions of the first region are advantageously consistent with the typical expected dimensions of the defect sought.

It is further provided to identify a respective plurality of regions 305, 306 of the digital image homologous to the first region 304 and distributed along the circumferential direction. Each homologous region contains a respective scheme sub-portion substantially identical to the scheme sub-portion of the first region. To this end, a correlation function is calculated (for example, the Pearson correlation coefficient) between the first region and a portion of the rest of the digital image. Preferably, a first homologous region 305 is first identified by calculating the correlation function between the first region 304 and a plurality of regions having dimensions equal to the first region and arranged in a neighbourhood of a point of the digital image that is circumferentially distant from the first region by a distance equal to a period P. For example, if the coordinates of the centre of the first region 304 are $x_0$, $y_0$, a region of equal dimensions is first identified, having the coordinates $x_0$, $y_0+P$ at the centre. Then, the correlation function is calculated between the first region and all the regions of the same dimensions whose centre is located in the neighbourhood of coordinates $x_0 \pm \Delta x$, $y_0+P \pm \Delta y$, with $\Delta x$, $\Delta y$ equal to an appropriate number of pixels, for example 5-10 pixels. The region having coordinates $x_1$, $y_1$ at the centre, at which the correlation function exhibits a maximum (at least local), is identified as the first homologous region 305.

The algorithm is repeated starting from the first homologous region 305 and seeking a correlation maximum in the neighbourhood of coordinates $x_1 \pm \Delta x$, $y_1+P \pm \Delta y$, in order to locate the second homologous region 306 (having at the centre coordinates $x_2$, $y_2$), and so on iteratively, so as to identify a sequence of homologous regions in succession. In particular, a tuple of coordinates $x_n$, $y_n$ is calculated, corresponding to the centre (or any other reference point) of the tuple of homologous regions.

In the example described herein, the acquisition of the value representative of the pattern period by processing the digital image and identifying such tuple of coordinates are performed on the image in diffuse light (of the type shown in FIG. 3).

However, the Applicant has verified that even more robust results can be obtained if the calculation operations of the period and/or identification of such tuple (for example the identification of homologous regions through autocorrelation) are carried out on a difference image, in which each pixel is associated with a value representative of the difference of the corresponding luminosity values of the second and third images acquired in grazing light, as described above.

This tuple of coordinates is then shown on the first image in diffuse light in order to identify a corresponding first region and a corresponding plurality of homologous regions in said first image.

It is further provided to calculate a model of the scheme sub-portion, in which each pixel is associated with a mean value of the values associated with the pixels of the first region and of the respective homologous regions of the first image having the same coordinates of said each pixel.

Figure 4:
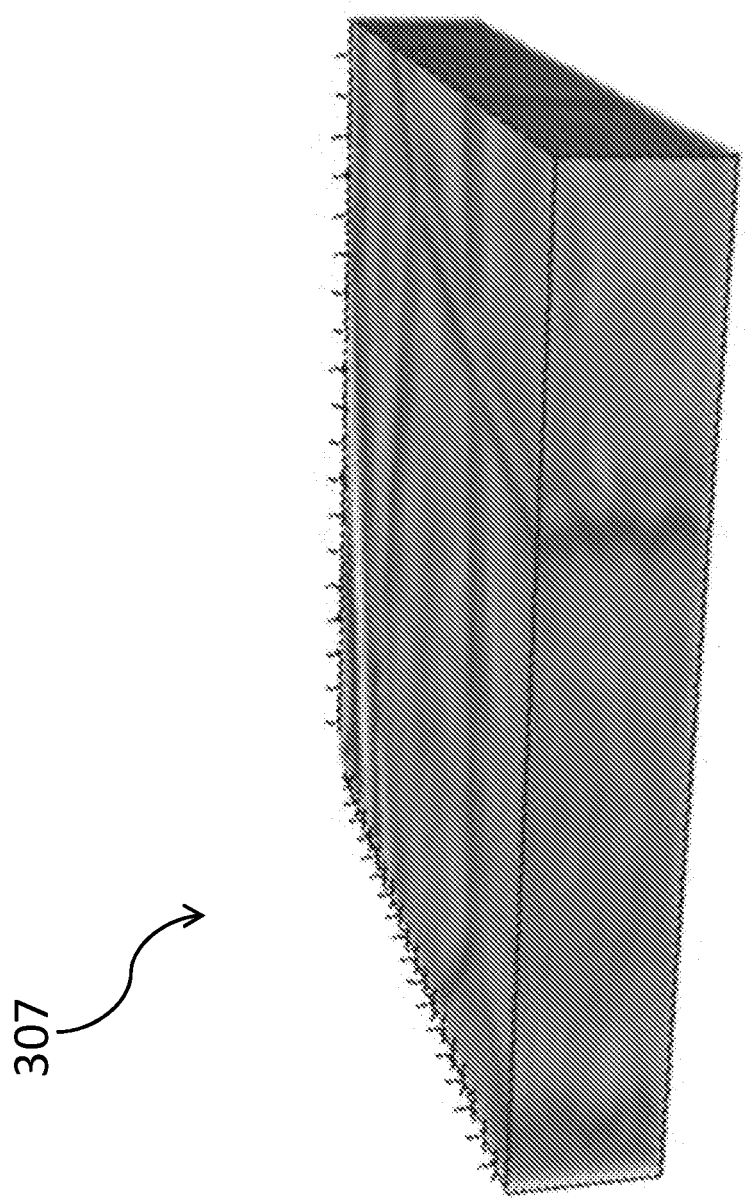

To this end, for illustration purposes, FIG. 4 shows a 3D graphical representation of a stack 307 of regions obtained by overlapping of the first region (for example at the base of the stack) and all its respective homologous regions of the first image in diffuse light. As can be seen, each pixel at the base of the stack corresponds to a set of statistical values (scalar, or grey scale) lying on the corresponding vertical column. Such statistical set has an intrinsic variance due to the deformations described above.

Figure 5:
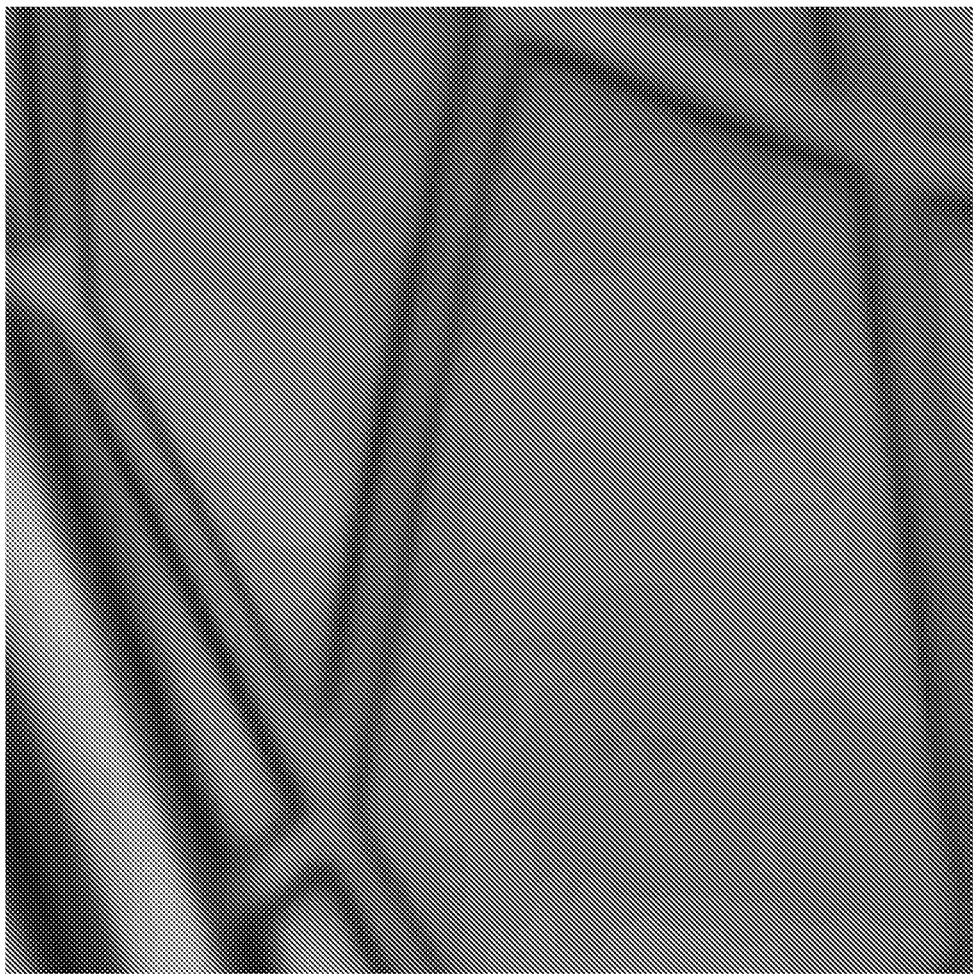

Preferably, the digital model 308 of the scheme sub-portion (shown in FIG. 5) associated with the first region 304 is calculated considering the median value of the corresponding statistical set for each pixel of the base of the stack. A model 308 is thus generated which has in each relative coordinate pixel (i,j) the median value (e.g. grey level) calculated on all of the relative coordinate pixels (i,j) of the set of the first region and of the homologous regions. As can be seen in FIG. 5, the model thus calculated does not contain contributions from any defects, in addition to exhibiting a high image quality (e.g. in terms of noise and/or sharpness).

Preferably, a digital model of the respective scheme sub-portion is calculated according to the above for a plurality of first regions, each comprising the respective scheme sub-portion. The first regions form a connected digital image portion having circumferential development about equal to the period. In this way, a digital model is calculated for the whole scheme that makes up the pattern. Preferably, the first regions are mutually partially overlapping in the axial direction and/or in the circumferential direction, in order to improve the reliability of the method.

Once the models of respective sub-portions have been constructed, a pattern model is obtained by replacing, in said first image, said model of the respective scheme sub-portion to each first region and to the respective homologous regions. By the above self-learning procedure, an image is obtained that is a global model of the surface portion without defects, that is easily comparable with the actual image.

For the purpose of this comparison, it is advantageous to use the gradient modulus and orientation as described hereinafter.

In one embodiment, for each pixel of the pattern model in luminosity values calculated on the first image, it is contemplated to calculate a modulus value and an orientation value of a gradient of the luminosity values associated with the pixels, thereby obtaining a pattern model in gradient modulus values and in gradient orientation values, respectively. In order to reduce the use of computing resources, it is preferable to calculate these gradient modulus and gradient orientation values on each scheme sub-portion model in luminosity values, and then proceed with the above operation of obtaining a pattern model by replacement.

In an alternative and preferred embodiment, the operations described above for the identification of homologous regions and the calculation of a respective scheme sub-portion model (preferably by the use of a tuple of coordinates identified on the difference image) are conducted on the gradient modulus values and on the gradient orientation values calculated on the first image in luminosity values. In this case, it is not strictly necessary to calculate the pattern model in luminosity values on the first image.

For the purposes of calculating the gradient modulus and orientation values, the gradient of the luminosity values is calculated for each digital image pixel along the two horizontal and vertical coordinates of the image, thus obtaining a vector with two components: a modulus (e.g. the root of the quadratic sum of the two components) and an orientation in the digital image (e.g. the angle formed by the vector with respect to the horizontal direction), normalized in the range [0-180°] or [−90°-+90°].

In order to calculate the gradient modulus and orientation values, it is for example to proceed as follows: being I(x,y)

each pixel of the input image (the notation (x,y) is omitted when unnecessary), the following is calculated:

Ix=I*Kx, where '*' is the convolution operator, and Kx is an appropriate kernel for the calculation of the first derivative in x (e.g. Kx=[1 −1])

Iy=I*Ky, where '*' is the convolution operator, and Ky is an appropriate kernel for the calculation of the first derivative in y (e.g. Ky=[1; −1])

Grad(x,y)=[Ix, Iy]=gradient of I(x,y)

gradient module=sqrt((Ix)^2+(Iy)^2)

gradient orientation=arctan(Iy/Ix)

Figure 6:
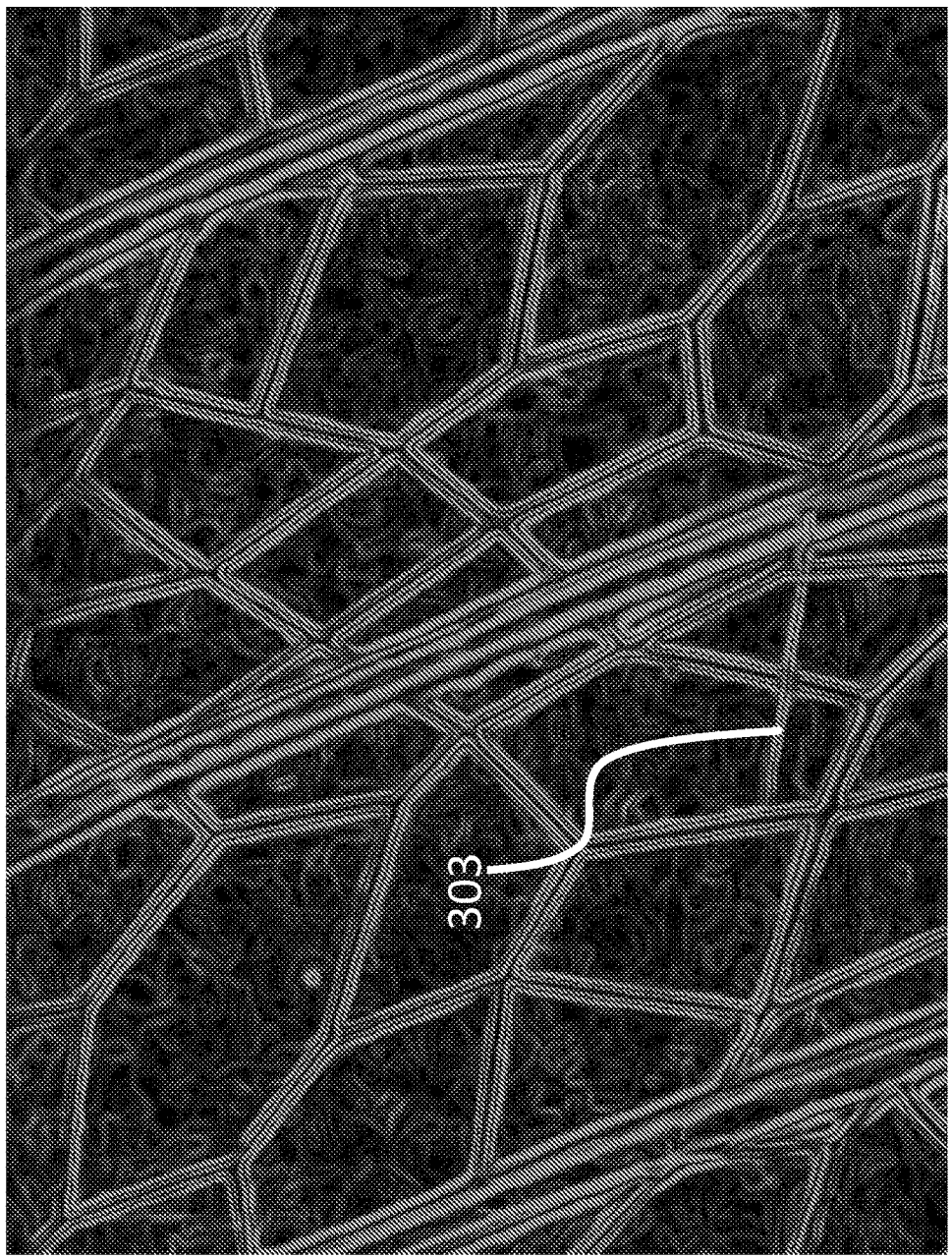

FIG. 6 shows an exemplary visualization of a surface sub-portion corresponding to a central portion of the image in FIG. 3, in which each pixel is associated with a grey level representative of (e.g. proportional to) the gradient modulus in the considered pixel (e.g. light pixels correspond to a high gradient modulus and vice versa).

Figure 7:
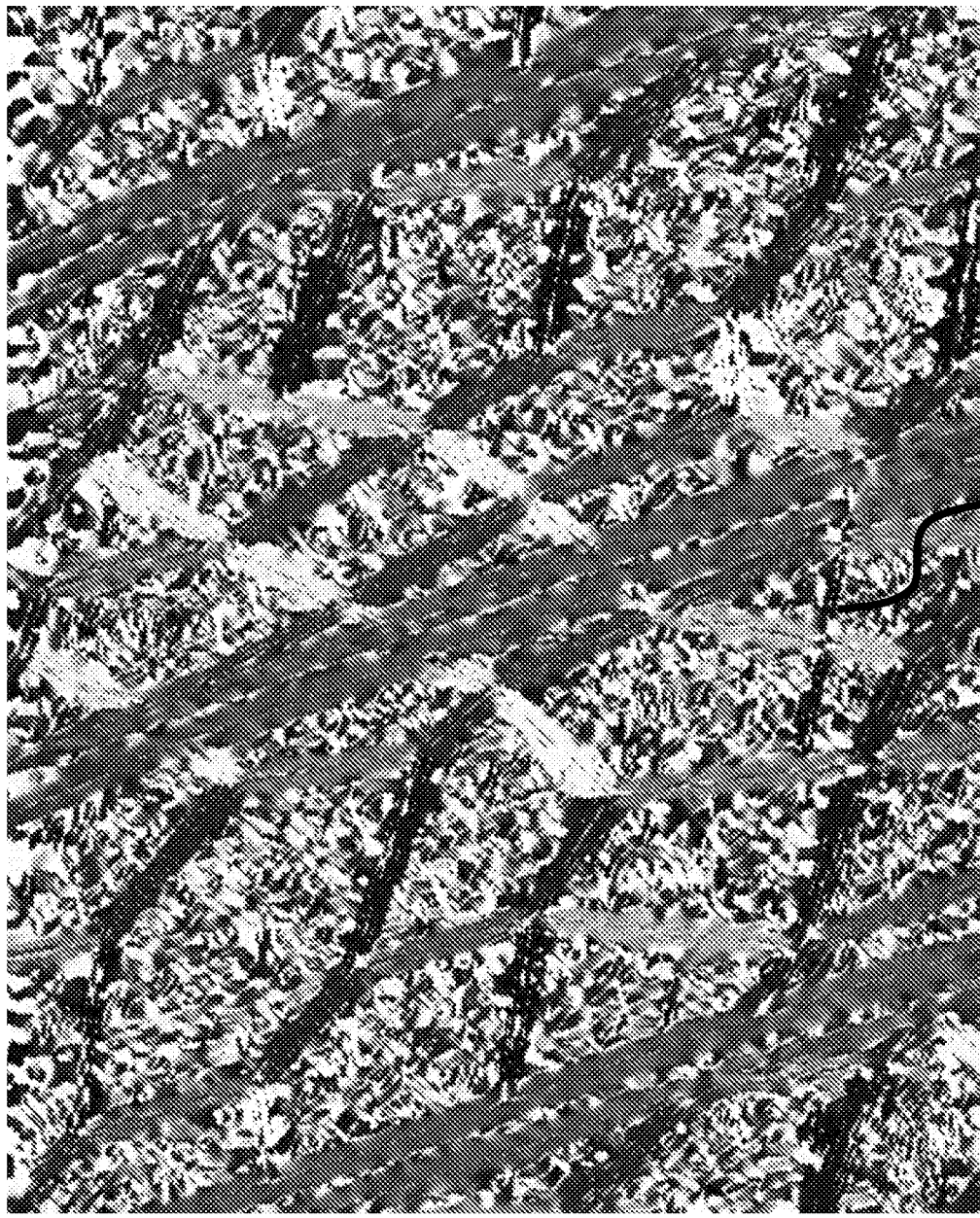

FIG. 7 shows an exemplary visualization of the same surface sub-portion in FIG. 6, in which each pixel is associated with a grey level uniquely representative of the gradient orientation in the pixel considered.

A comparison between FIGS. 6 and 7 shows that the low gradient modulus zones out of the pattern are characterized by a non-significant orientation value (variable disorderly).

As said above, by executing the following operations on the digital images as shown in FIGS. 6 and 7: identifying a plurality of first regions; for each first region, identifying a respective plurality of homologous regions; and calculating a respective model, the pattern model is obtained in gradient modulus values and gradient orientation values, respectively.

At this point, the resulting pattern model (be it in luminosity values and/or modulus values and/or gradient orientation values) is subjected to dilation to introduce a tolerance that takes account of the deformations and/or drifts of the scheme in the pattern.

In a first preferred embodiment, the pattern model in gradient modulus values is first binarised (for example by thresholding with a single or double threshold) to obtain a binary model of the pattern.

Such binary model of the pattern is subjected to dilation (for example by means of a morphological processing operation) in order to obtain a dilated pattern binary model in which the pixels have an associated first binary index, the value of which is indicative of whether the pixel belongs or not to the dilated patterns, respectively (in order to distinguish the pixels belonging to the background from those belonging to the dilated pattern the first image by comparison with such a dilated binary model).

Moreover, also the gradient orientation values of the pattern model are preferably subjected to dilation. Preferably, each pixel of the dilated pattern binary model belonging to the dilated pattern is associated with a second index, the value of which is representative of the orientation of the dilated pattern section passing by the pixel: for example, the gradient orientation value of the pixel having maximum gradient modulus value in a predetermined neighbourhood (for example equal to 5-10 pixels of radius) of said each pixel in said pattern model may be selected.

In a second alternative embodiment, the gradient modulus values and the gradient orientation values of the pattern model are first both subjected to dilation. For example, each pixel of the dilated pattern model is assigned as gradient modulus value the maximum value of the gradient module in a predetermined neighbourhood of said pixel in the pattern model (said neighbourhood exemplarily having a radius equal to 5-10 pixels) and as gradient orientation value that associated with the pixel having said maximum gradient modulus value. Subsequently, the pattern model thus obtained is binarised based on the gradient modulus value, thereby obtaining the value of said first index.

Figure 8:
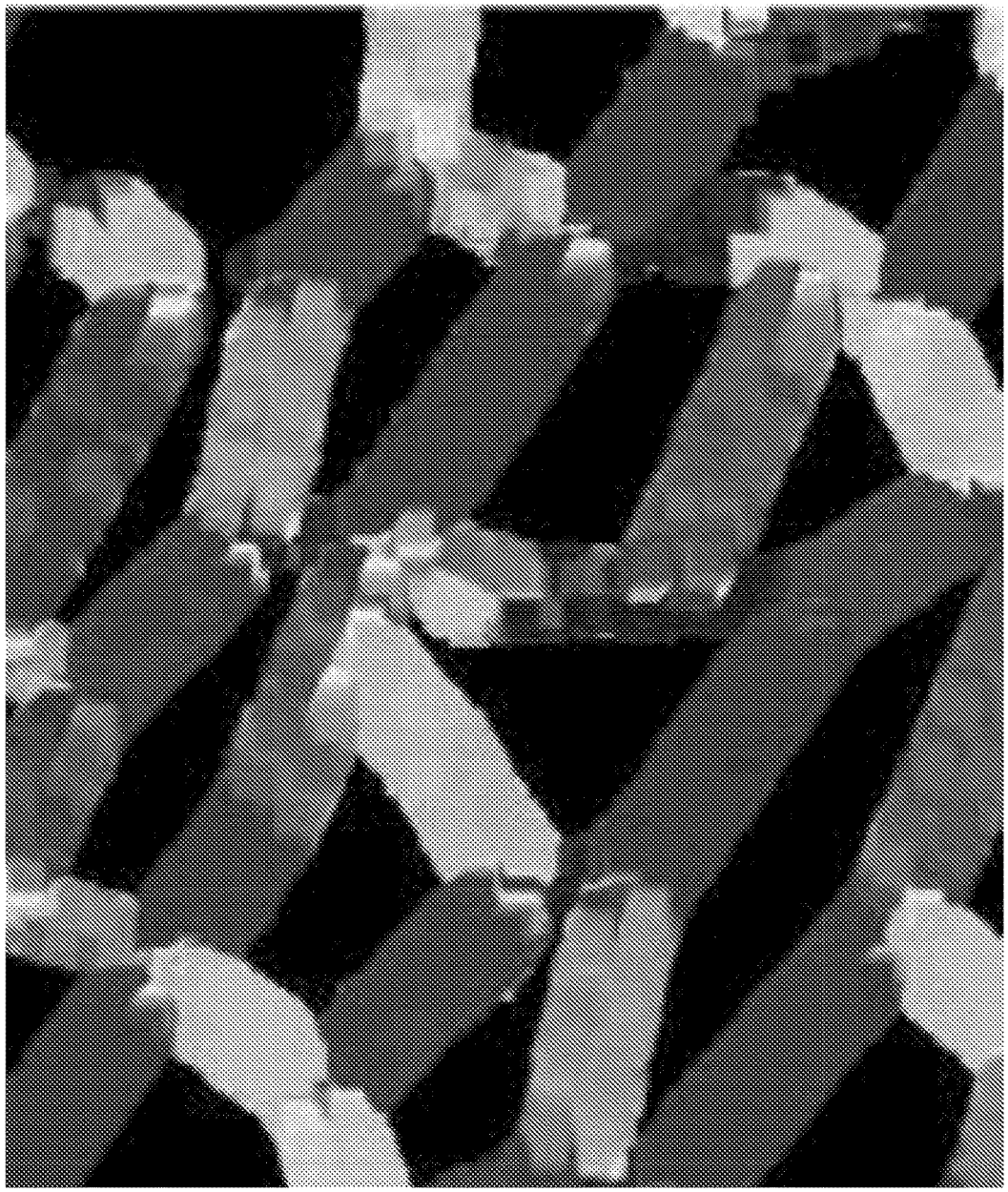

FIG. 8 shows an example of pattern model obtained as a result of said operations in the two embodiments. Each pixel of the image in FIG. 8 not belonging to the dilated pattern but to the pattern background (for example having value of said first index equal to zero) is shown in black. Each pixel belonging to the dilated pattern (for example having value of said first index equal to one) is shown in a grey level other than black, where each grey level biuniquely corresponds to a value of the second index representative of the orientation of the corresponding segment of the dilated pattern passing by the considered pixel. As can be seen, the pixels outside the dilated pattern (black pixels) do not have an associated significant value of the second index.

Before making the comparison between the first image of the tyre acquired in diffuse light into luminosity values and the dilated pattern model as obtained above, it is advantageous to process such first image in order to highlight the potential defects of the rest of the image.

To support the description of the method for highlighting potential defects, reference will be made to FIGS. 9-12.

Figure 3A:
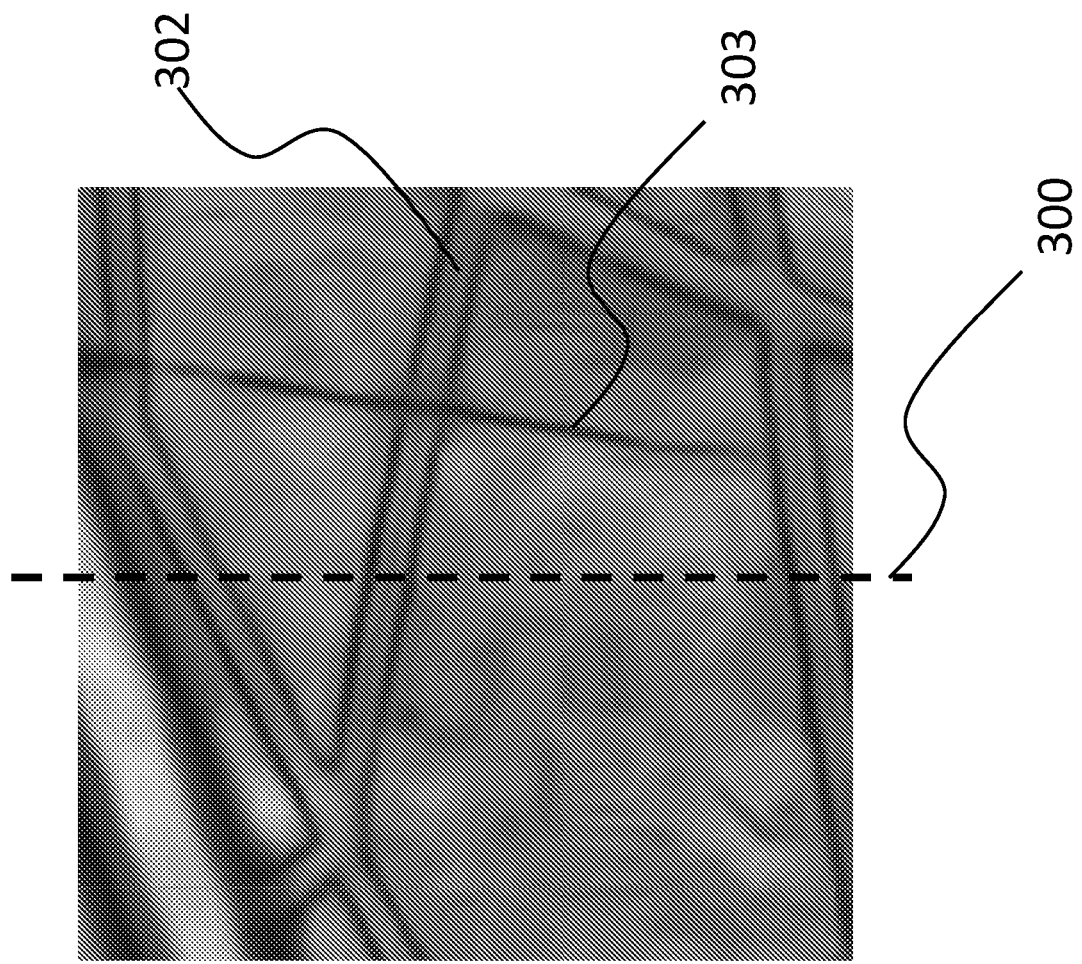
Figure 9:
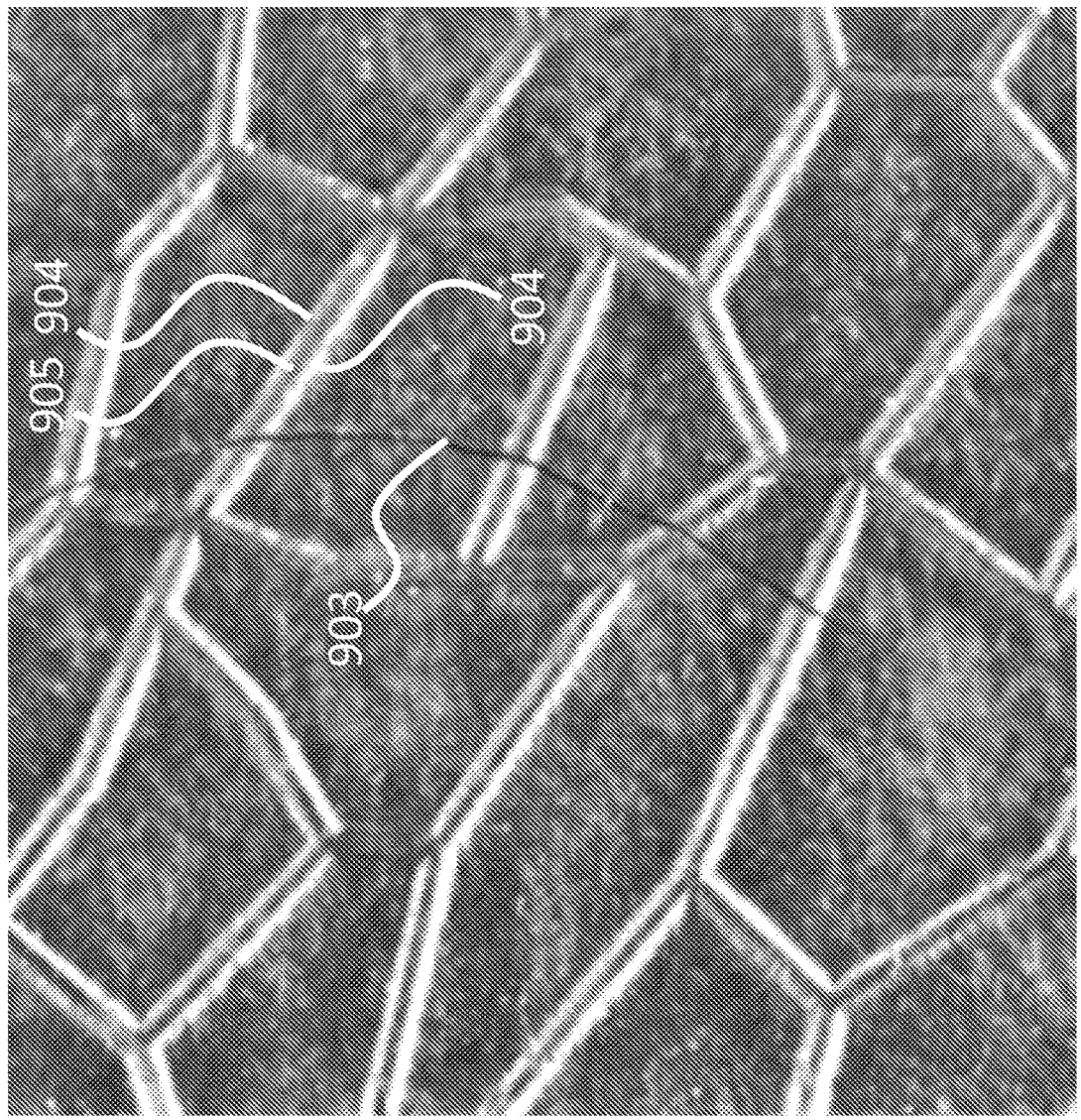

FIG. 9 exemplarily shows a visual representation in greyscale of a further example of a portion of the first image, of a similar nature to that shown in FIGS. 3 and 3a, showing a further inner surface portion of a tyre illuminated with diffuse light, in which a defect 903 is present, consisting of a cut that crosses some segments of the pattern. On the surface portion in FIG. 9 there were traces of a release agent used in the bladder, in particular on the walls of the pattern segments. Since this release agent is highly reflective, such walls of the pattern segments in the image give rise to a pair of very bright parallel lines 904. A darker line 905 is present between the two bright lines which corresponds to the 'top' of the pattern segments, less dirty with release agent. In such a situation, in principle, segments 905 may be confused with cuts 903 as they have similar luminosity features.

In order to highlight the potential defects from the rest of the image, it is contemplated to calculate a value representative of the main eigenvalue (or maximum eigenvalue) of the Hessian matrix in said pixel for each pixel of the first image in luminosity values.

By way of example, the Hessian matrix is calculated as follows. Being, as above, I(x,y) each pixel of the input image, the following is calculated:

Ixx=I*Kxx, where '*' is the convolution operator, and Kxx is an appropriate kernel for the calculation of the second derivative in x (e.g. Kxx=[1 −2 1] row vector)

Iyy=I*Kyy, where '*' is the convolution operator, and Kyy is an appropriate kernel for the calculation of the second derivative in y (e.g. Kyy=[1; −2; 1] column vector)

Ixy=Iyx=I*Kxy where '*' is the convolution operator and Kxy is an appropriate kernel for the calculation of the mixed derivative (e.g. the matrix Kxy=[1 0 −1; 0 0 0; −1 0 1] where ";" is the line separator).

The Hessian H=[Ixx Ixy; Iyx Iyy] is thus obtained.

From the Hessian matrix H, the eigenvectors and the eigenvalues are calculated, for example by the algorithm EVD (Eigen Value/Vector Decomposition).

Preferably, the main eigenvalue values are binarised by comparison with a first threshold value, in order to identify the proposed defect pixel like those pixels whose maximum eigenvalue associated is above such first threshold value.

Figure 10:
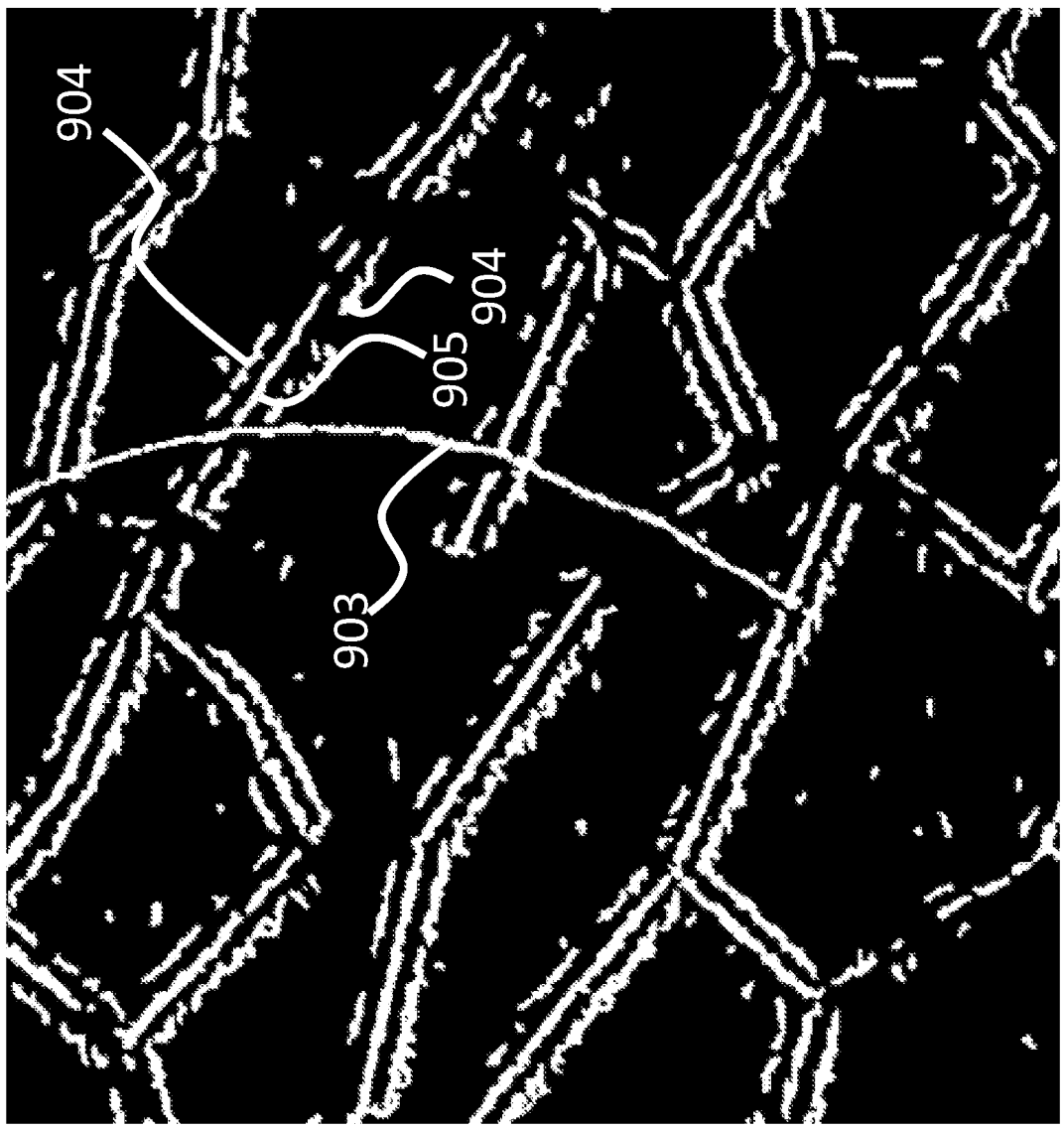

FIG. 10 shows an exemplary visualisation of the first image portion substantially corresponding to that shown in FIG. 9, binarised on the basis of the main eigenvalue. It is noted that said binarisation has enhanced both the pixels belonging to cut 903 and the pixels at walls 904 (more precisely of the transition areas between the pattern background and walls 904) and of the central areas 905 of the pattern segments 905 where the maximum eigenvalue is high.

In order to eliminate at least the pixels in the transition areas between the pattern background and the walls of the pattern segments from the proposed defects thus obtained, as well as other spurious pixel, it is contemplated to compare the gradient modulus values calculated on the luminosity values of the first image with a second threshold value and identify the pixels with a gradient modulus value smaller than such second threshold value as proposed defects.

Figure 11:

FIG. 11 substantially shows the same image portion in FIG. 9 wherein the pixels have been binarised on the basis of the gradient modulus (optionally with appropriate edge smoothing operations). The white pixels are those with low gradient modulus value, i.e. smaller than the second threshold value. It is noted that pixels 904 at the edges of the pattern segments have a high gradient value.

Figure 12:
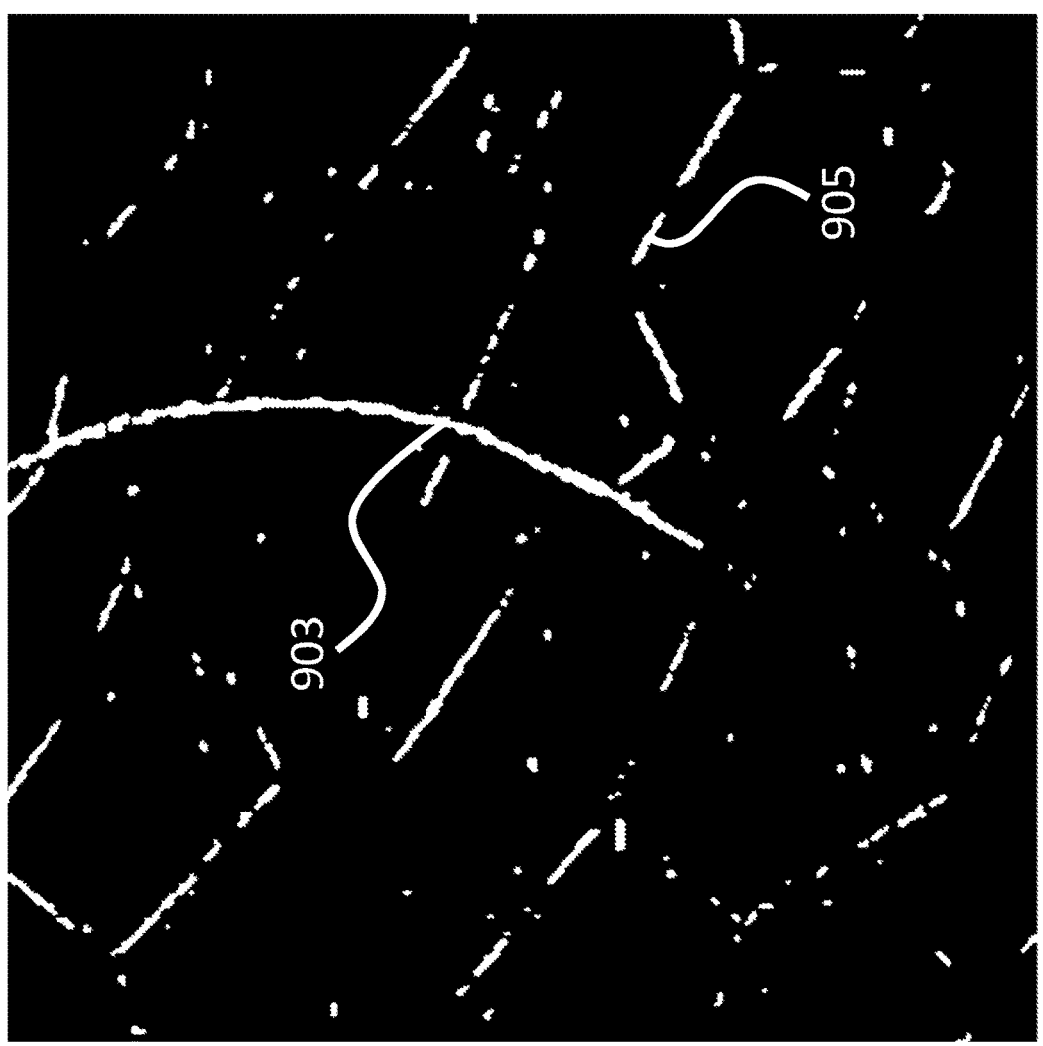

FIG. 12 substantially shows the same image portion in FIG. 10, where the white pixels are the proposed defects obtained from the concurrent thresholding with said two threshold values (i.e. the white pixels both in FIG. 10 and in FIG. 11). It is noted that some pixels 905 remain as proposed defects at the centre of some pattern sections, while almost all pixels at the edges of the pattern sections have been substantially filtered by the criterion.

In order to further select the proposed defects, a third selection criterion is preferably provided, preferably used in combination with said two further criteria, based on the luminosity value in the image acquired in diffuse light. In particular, such luminosity value is compared with a third threshold value and all the proposed defect pixels as identified above are selected, which also have the luminosity value below the third threshold value.

At this point, it is possible to make the comparison between the proposed defect pixels thus selected with the dilated pattern model free from defects as calculated above, in order to detect any defects in the surface portion as a function of such comparison.

Preferably, a first set of pixels is identified among said proposed defect pixels for which the corresponding pixels in the dilated pattern model do not belong to the dilated pattern (for example with reference to FIG. 8, the black 'background' areas), to identify the defects (or defect portions) located outside the pattern, i.e. belonging to the pattern 'background'.

Preferably, it is contemplated to identify a second set of pixels among said proposed defect pixels that have the corresponding pixel in the pattern model belonging to the pattern (for example the pixels in grey level other than black in FIG. 8), for which the at least local orientation of the pattern section passing by said dilated pattern model (represented by said second value, e.g. the orientation value of the dilated gradient) is significantly different (for example, the difference is greater than 20°) from the orientation of the section formed by said proposed defects and passing by said pixel. In that case, such proposed defect section passing by said pixel is probably a cut having a portion that intersects with a pattern section in said dilated pattern model.

In a first embodiment, the orientation of the section formed by said proposed defects and passing by said pixel is represented by the gradient orientation value in said pixel calculated as described above on the luminosity values in the first image in diffuse light.

In a second embodiment, the orientation of the section formed by said proposed defects and passing by said pixel is represented by the orientation of the main eigenvector of the Hessian matrix in said pixel calculated as described above on the luminosity values in the first image in diffuse light.

Figure 13:
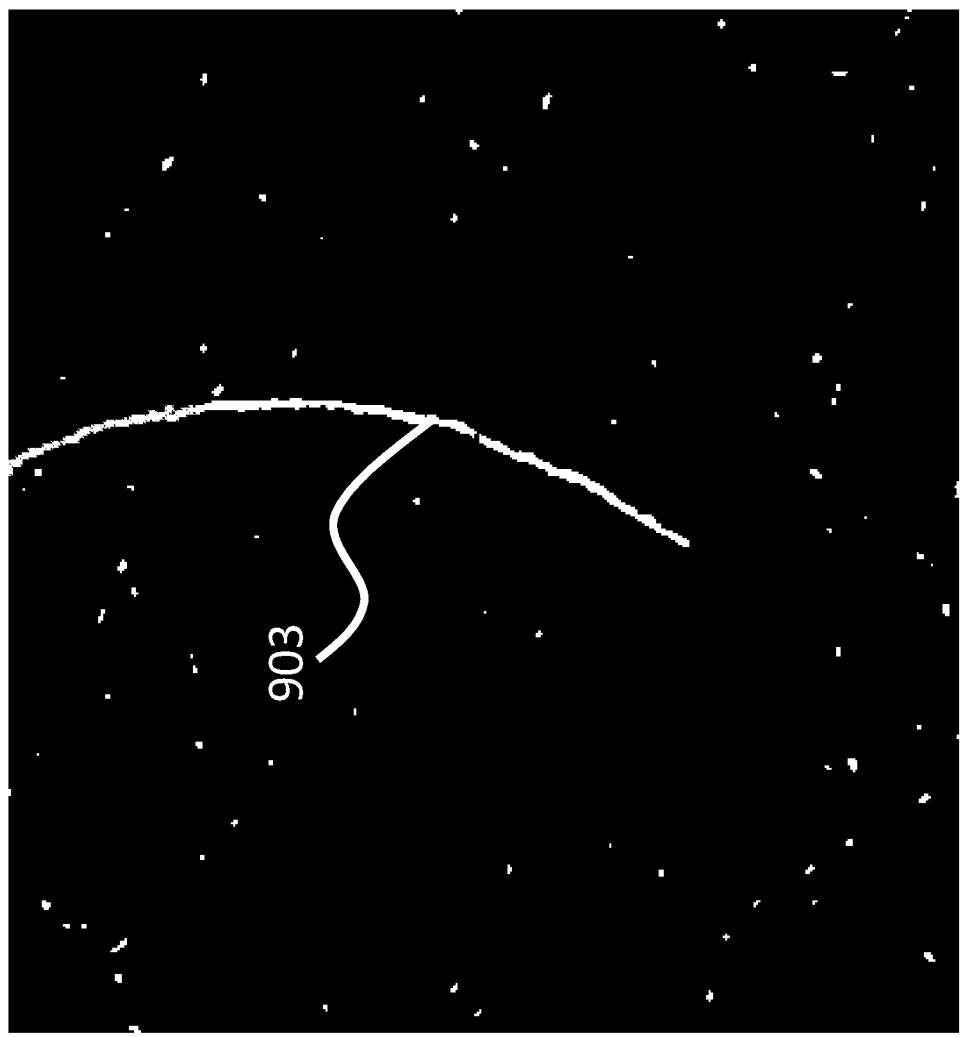

Preferably, it is contemplate to merge (in OR logic) the first and second set of pixels to form a final image (typically binary) representative of said surface portion wherein the pixels corresponding to said first and second set are distinct from the remaining pixels, as exemplarily shown in FIG. 13, where it is seen that both the cutting portion at the pattern background and the cut portion at the dilated pattern has been identified.

Figure 14:
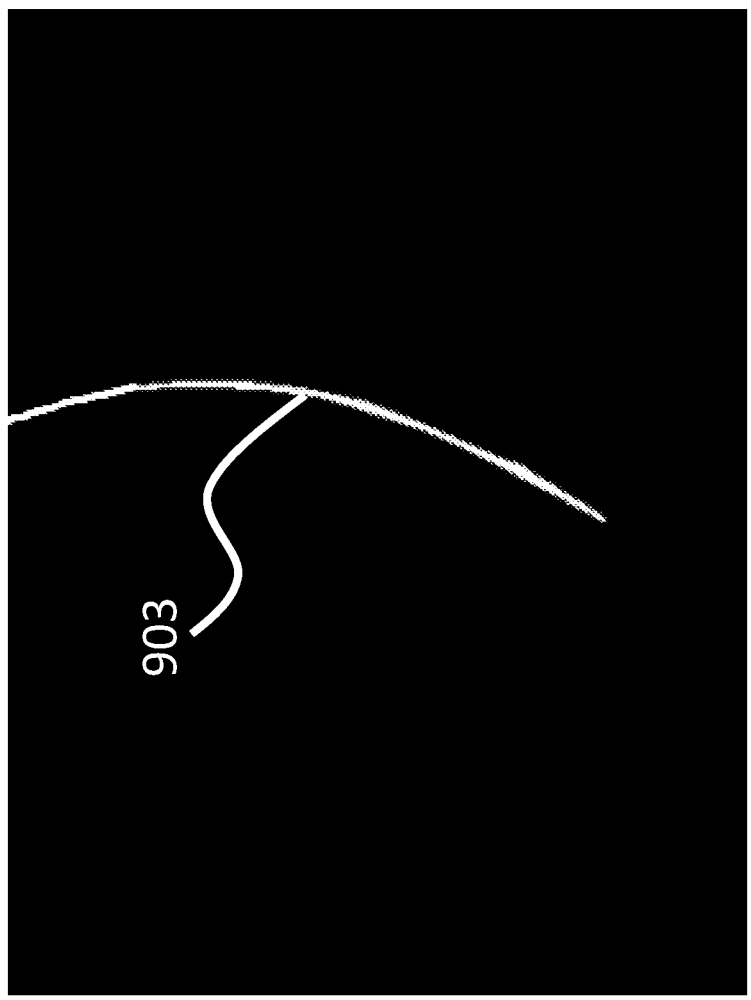

Preferably, appropriate morphological processing can be carried out on said pixels in order to discard false proposed defects. For example, the isolated pixels blocks or the connected pixel regions ('blob') that are not compatible with the defects sought are eliminated; in particular, the selection can be made by area and/or length. FIG. 14 shows the end result of a processing of this type carried out on the image in FIG. 13.

FIG. 15 shows a flowchart of the method according to an embodiment of the present invention, wherein operation 1010 represents operation a) of providing the tyre having a surface to be analysed having a pattern with a scheme that it repeated substantially equal thereto in a plurality of positions.

Operation 1020 represents operation b) of acquiring one or more digital images of a surface portion wherein the pattern includes the scheme repeated a plurality of times.

Operation 1030 represents operation c) of identifying a plurality of first regions of said one or more digital images, each first region corresponding to a respective scheme sub-portion.

Operation 1040 represents operation d) of identifying a respective plurality of regions of said one or more digital images homologous to each first region, wherein a respective scheme sub-portion in each homologous region is substantially identical to said respective scheme sub-portion of said each first region.

Operation 1050 represents operation e) of calculating, for each first region, a model of the respective scheme sub-portion, said scheme sub-portion model being a digital image wherein each pixel is associated with an average value of values associated with the pixels of said each first region and of the respective homologous regions having the same relative coordinates of said each pixel, thus obtaining a plurality of calculated scheme sub-portion models.

Operation 1060 represents operation f) of obtaining a model of said pattern in said surface portion by combining said calculated scheme sub-portion models.

The invention claimed is:

1. An apparatus for analysing a tyre in a tyre production line, comprising:
    a support for a tyre, adapted to rotate around an axis perpendicular thereto;
    at least one source adapted to emit at least one light radiation for illuminating a surface portion of the tyre, when set on the support, and, at a distance from said source, a detection system adapted to detect an optical intensity of the light radiation reflected and/or diffused by said surface portion; and
    a processing unit configured for carrying out:
        a) providing the tyre having said surface to be analyzed, wherein said surface has a pattern having a scheme that is repeated, substantially equal thereto, in a plurality of positions along a direction of periodicity with a substantially constant period;

b) acquiring one or more digital images of a portion of the surface, wherein the portion includes the scheme that is repeated c) identifying a plurality of first regions of said one or more digital images, wherein each first region corresponds to a respective sub-portion of the scheme, and wherein each first region comprises a plurality of pixels comprising respective relative coordinates in said first region;

d) obtaining a value representative of the substantially constant period;

e) by using the value, obtaining a plurality of sequences, wherein each of the plurality of sequences comprise a sequence of homologous regions repeated along a direction of periodicity with a substantially constant period, wherein each homologous region of each sequence comprises a plurality of pixels comprising respective relative coordinates in said homologous region, and wherein a respective scheme sub-portion in each homologous region is substantially identical to said respective scheme sub-portion of a respective first region;

f) for each first region, calculating a model of the respective scheme sub-portion, said scheme sub-portion model being a digital image wherein each pixel is associated with an average value of values associated with pixels of said each first region and of each respective homologous region in the respective sequence of homologous regions having the same relative coordinates of said each pixel, thus obtaining a plurality of calculated scheme sub-portion models; and g) obtaining a model of said pattern in said surface portion by combining said calculated scheme sub-portion models.

2. The apparatus as claimed in claim 1, wherein the detection system comprises a linear camera having an objective line lying on an optical plane passing through the linear camera, wherein said at least one source comprises a first light source, a second light source and a third light source respectively adapted to emit a first, a second and a third light radiation for illuminating a linear surface portion coinciding with or in proximity to said objective line, wherein said first light source and second light source respectively lie on opposite sides with respect to said optical plane, wherein each of said first and second light sources is adapted to illuminate said objective line with a respective grazing light, and said third light source is adapted to illuminate said objective line with diffused light, and wherein the apparatus comprises a drive and control unit configured for:

activating, in alternating sequence, said first light source, second light source and third light source; and driving said linear camera for respectively acquiring a first, second and third image synchronously with activation of said first light source, second light source and third light source, respectively.

3. The apparatus as claimed in claim 2, wherein the detection system comprises a mirror having a reflective surface arranged at the third light source perpendicular to the optical plane and intersecting the optical plane in a manner so as to reflect said objective line in the optical plane by an angle greater than or equal to 30° or smaller than or equal to 135°.

4. A method for analyzing a surface of a tyre, comprising:

a) providing the tyre having said surface to be analyzed, wherein said surface has a pattern having a scheme that is repeated, substantially equal thereto, in a plurality of positions along a direction of periodicity with a substantially constant period;

b) acquiring one or more digital images of a portion of the surface, wherein the portion includes the scheme that is repeated;

c) identifying a plurality of first regions of said one or more digital images, wherein each first region corresponds to a respective sub-portion of the scheme, and wherein each first region comprises a plurality of pixels comprising respective relative coordinates in said first region;

d) obtaining a value representative of the substantially constant period;

e) by using the value, obtaining a plurality of sequences, wherein each of the plurality of sequences comprise a sequence of homologous regions repeated along a direction of periodicity with a substantially constant period, wherein each homologous region of each sequence comprises a plurality of pixels comprising respective relative coordinates in said homologous region, and wherein a respective scheme sub-portion in each homologous region is substantially identical to said respective scheme sub-portion of a respective first region;

f) for each first region, calculating a model of the respective scheme sub-portion, said scheme sub-portion model being a digital image wherein each pixel is associated with an average value of values associated with pixels of said each first region and of each respective homologous region in the respective sequence of homologous regions having the same relative coordinates of said each pixel, thus obtaining a plurality of calculated scheme sub-portion models; and g) obtaining a model of said pattern in said surface portion by combining said calculated scheme sub-portion models.

5. The method as claimed in claim 4, wherein said plurality of first regions forms a connected portion of said one or more digital images comprising at least said scheme.

6. The method as claimed in claim 4, wherein said first regions are partially overlapped on each other in an axial direction and/or in a circumferential direction of the tyre.

7. The method as claimed in claim 4, wherein obtaining a plurality of sequences regions comprises calculating a correlation function between said respective first region and at least one portion of a remaining part of said one or more digital images.

8. The method as claimed in claim 7, wherein obtaining a plurality of sequences comprises identifying one at least local extremum of said correlation function.

9. The method as claimed in claim 4, wherein said portion of the surface is selected in a manner such that in said one or more digital images, said scheme is repeated, substantially equal thereto, at least eight times in a plurality of positions distributed along a circumferential direction of the tyre, and said direction of periodicity is directed along the circumferential direction, and wherein obtaining a value representative of the substantially constant period comprises seeking a maximum of a correlation function between one portion of said one or more digital images and a plurality of further portions of said one or more digital images having size equal to the size of said portion of said one or more digital images and distributed along said periodicity direction.

10. The method as claimed in claim 9, wherein obtaining a plurality of sequences comprises identifying a respective first homologous region by calculating said correlation function between said respective first region and a plurality of regions having a size equal to said respective first region and arranged around a point of said one or more digital images located along said periodicity direction at a distance from said respective first region equal to an integer multiple of said period.

11. The method as claimed in claim 9, wherein obtaining a value representative of the substantially constant period, identifying a plurality of first regions and obtaining a plurality of sequences are carried out at least in said difference image, by processing said difference image.

12. The method as claimed in claim 4, wherein obtaining a plurality of sequences comprises identifying each respective sequence of respective homologous regions in succession, each respective homologous region of said respective sequence being identified by using a respective preceding homologous region in the respective sequence.

13. The method as claimed in claim 4, wherein, in calculating said model of a respective scheme sub-portion, the average value is chosen from an arithmetic mean, a geometric mean, a mode, and combinations thereof, of said values.

14. The method as claimed in claim 4, wherein, in calculating a model of a respective scheme sub-portion, the average value comprises a median value of said values.

15. The method as claimed in claim 4, wherein acquiring one or more digital images comprises: illuminating said surface portion with diffused light and acquiring a first image wherein each pixel is associated with a luminosity value representative of a reflectivity and/or diffusivity and/or colour of a point of a surface corresponding to said each pixel; illuminating said surface portion with grazing light respectively coming from opposite directions and respectively acquiring a second and a third image, wherein each pixel is associated with a luminosity value representative of a reflectivity and/or diffusivity and/or colour of a point of a surface corresponding to said each pixel; and calculating a difference image wherein each pixel is associated with a value representative of a difference of corresponding luminosity values of said second and third image.

16. The method as claimed in claim 15, wherein identifying a plurality of first regions and obtaining a plurality of sequences are carried out at least in said difference image, by processing said difference image.

17. The method as claimed in claim 15, wherein identifying a plurality of first regions and obtaining a plurality of sequences are carried out in said first image.

18. The method as claimed in claim 17, wherein identifying each of said first regions and obtaining a plurality of sequences comprises identifying, by processing said difference image, a respective position of said respective first region and of said respective homologous regions in said difference image and subsequently identifying, in said first image, a corresponding first region and a corresponding respective sequence of homologous regions having said respective positions.

19. The method as claimed in claim 15, wherein calculating said model of a respective scheme sub-portion is carried out on said first image.

20. The method as claimed in claim 15, wherein:
said first image comprises one or more images; and
said pattern model is obtained by substituting, in at least one image from among said one or more images, each first region and respective homologous regions with said model of respective scheme sub-portion.

21. The method as claimed in claim 15, wherein the first image comprises one or more digital images, and the method comprises comparing said one or more digital images, with said pattern model and, based on such comparison, detecting possible defects in said one or more digital images.

22. The method as claimed in claim 4, wherein, for each pixel of at least one image between said one or more digital images, provision is made for calculating a gradient of values associated with the pixels along two coordinates of said image, said gradient being a vector with two components representative of a variation of said values respectively along said two coordinates, and wherein each pixel is associated with a gradient modulus value and a gradient orientation value.

23. The method as claimed in claim 22, wherein one or more operations of identifying said plurality of first regions, obtaining a plurality of sequences, calculating said model of respective scheme sub-portion and calculating said pattern model are carried out based on said gradient modulus values and/or on said gradient orientation values.

24. The method as claimed in claim 22, wherein, for each pixel of the pattern model calculated on said first image, provision is made for calculating said gradient modulus value and said gradient orientation value of luminosity values.

25. The method as claimed in claim 4, wherein said pattern model is obtained by substituting, in at least one image from among said one or more images, each first region and respective homologous regions with said model of respective scheme sub-portion.

26. The method as claimed in claim 4, comprising comparing said one or more digital images, with said pattern model and, based on such comparison, detecting possible defects in said one or more digital images.

27. The method as claimed in claim 4, comprising calculating a dilated pattern model by a dilation operation conducted on the pattern model obtained and based on modulus gradient values of the pattern model in luminosity values.

28. The method as claimed in claim 27, wherein said dilation operation comprises assigning to each pixel of the dilated pattern model, a maximum gradient modulus value calculated in a predetermined area around a corresponding pixel in said pattern model.

29. The method as claimed in claim 27, wherein the pattern model is processed, before or after said dilation, on a basis of said gradient modulus value, in a manner such as to obtain a binary model of pattern wherein each pixel is associated with a first index whose value is representative of whether the pixel belongs to the pattern or not.

30. The method as claimed in claim 29, wherein the binary model is dilated and the value of the first index is binary.

31. The method as claimed in claim 4, wherein said surface portion is a circumferential portion of internal surface corresponding to an angle at the center that is greater than or equal to 60° and having a width, on a plane passing through an axis, greater than or equal to 50 mm, and/or smaller than or equal to 200 mm, and wherein the method is repeated by varying each time said circumferential internal surface portion in a manner such that a set of the surface portions constitutes at least one entire internal semi-surface portion of the tyre that extends from an equatorial plane to a bead of said tyre.

* * * * *